(12) United States Patent
Zhu et al.

(10) Patent No.: US 9,545,840 B2
(45) Date of Patent: Jan. 17, 2017

(54) HYBRID-POWER DRIVING SYSTEM FOR A VEHICLE AND A TRANSMISSION THEREOF

(71) Applicant: SAIC Motor Corporation Limited, Shanghai (CN)

(72) Inventors: Jun Zhu, Shanghai (CN); Jian Wang, Shanghai (CN); Hailong Ge, Shanghai (CN); Zhenxing Fu, Shanghai (CN); Sidong Luo, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 0 days.

(21) Appl. No.: 14/752,306

(22) Filed: Jun. 26, 2015

(65) Prior Publication Data

US 2016/0137049 A1 May 19, 2016

(30) Foreign Application Priority Data

Nov. 18, 2014 (CN) .......................... 2014 1 0658499

(51) Int. Cl.
*F16H 37/06* (2006.01)
*B60K 6/365* (2007.10)
(Continued)

(52) U.S. Cl.
CPC ................. *B60K 6/365* (2013.01); *B60K 6/48* (2013.01); *B60K 6/547* (2013.01); *F16H 3/091* (2013.01);
(Continued)

(58) Field of Classification Search
None
See application file for complete search history.

(56) References Cited

U.S. PATENT DOCUMENTS

| 4,584,892 A | 4/1986 | Hiraiwa et al. |
| 5,106,352 A | 4/1992 | Lepelletier |

(Continued)

FOREIGN PATENT DOCUMENTS

| CN | 101875298 A | 11/2010 |
| CN | 102490585 A | 6/2012 |

(Continued)

OTHER PUBLICATIONS

U.S. Appl. No. 14/948,034, filed Nov. 20, 2015, inventors: Jun Zhu, Chengjie Ma, Zhengmin Gu, Xiajun Ye, Pengjun Zhang, Peng Zhang, and Jing Gu.

(Continued)

*Primary Examiner* — Dirk Wright
(74) *Attorney, Agent, or Firm* — McDonnell Boehnen Hulbert & Berghoff LLP

(57) ABSTRACT

A hybrid-power driving system (HPDS) (110) includes an engine, a motor, and a transmission. The HPDS may include a single clutch and the transmission can provide at least six forward speed ratios and can provide for a reverse speed ratio. The transmission can include three synchronizers and multiple gearwheels that are used in multiple speed ratios. In addition to a pure engine driving mode and a pure motor driving mode, the HPDS can operate using a hybrid-power driving mode (HDM). In the HDM, the HPDS can provide for shifting of gears without power interruption to the half-axles and wheels of a vehicle. In the HDM, the continuous power being output can be achieved by keeping a synchronizer engaged to a gearwheel for two consecutive speed ratios.

11 Claims, 23 Drawing Sheets

(51) Int. Cl.
  *B60K 6/48* (2007.10)
  *B60K 6/547* (2007.10)
  *F16H 3/091* (2006.01)
  *F16H 3/08* (2006.01)

(52) U.S. Cl.
  CPC .............. *B60K 2006/4816* (2013.01); *B60K 2006/4841* (2013.01); *B60Y 2200/92* (2013.01); *F16H 2003/0807* (2013.01); *F16H 2003/0822* (2013.01); *F16H 2003/0826* (2013.01); *F16H 2200/0052* (2013.01); *Y10S 903/911* (2013.01); *Y10S 903/919* (2013.01)

(56) References Cited

U.S. PATENT DOCUMENTS

| | | |
|---|---|---|
| 5,425,283 A | 6/1995 | Wehking |
| 5,558,595 A | 9/1996 | Schmidt et al. |
| 5,789,823 A | 8/1998 | Sherman |
| 6,019,697 A | 2/2000 | Colletti |
| 6,592,484 B1 | 7/2003 | Tsai et al. |
| 6,886,424 B2 | 5/2005 | Janson et al. |
| 7,597,020 B2 | 10/2009 | Baldwin |
| 7,611,433 B2 | 11/2009 | Forsyth et al. |
| 7,895,910 B2 | 3/2011 | Caenazzo et al. |
| 8,109,167 B2 | 2/2012 | Mohlin et al. |
| 8,116,951 B2 * | 2/2012 | Holmes .................... B60K 6/36 475/208 |
| 8,333,126 B2 | 12/2012 | Enstroem et al. |
| 8,444,519 B2 | 5/2013 | Borntraeger et al. |
| 8,549,959 B2 | 10/2013 | Kasuya et al. |
| 8,672,109 B2 | 3/2014 | Quartier et al. |
| 8,672,803 B2 | 3/2014 | Tamba et al. |
| 8,677,847 B2 | 3/2014 | Diani et al. |
| 8,689,655 B2 | 4/2014 | Diani et al. |
| 8,714,287 B2 | 5/2014 | Kim et al. |
| 8,727,939 B2 | 5/2014 | Chen et al. |
| 8,763,485 B2 | 7/2014 | Thomas |
| 8,771,136 B2 | 7/2014 | Miller et al. |
| 8,784,249 B2 | 7/2014 | Motodohl et al. |
| 9,358,873 B2 * | 6/2016 | Moore .................... F16H 3/089 |
| 2001/0051556 A1 | 12/2001 | Takenaka |
| 2004/0251064 A1 | 12/2004 | Imai |
| 2004/0251862 A1 | 12/2004 | Imai |
| 2009/0199666 A1 | 8/2009 | Yang et al. |
| 2010/0276218 A1 | 11/2010 | Thompson et al. |
| 2010/0311540 A1 | 12/2010 | Hellenbroich |
| 2011/0239820 A1 | 10/2011 | Shibahata |
| 2012/0104904 A1 | 5/2012 | Abiko et al. |
| 2012/0234133 A1 | 9/2012 | Ikegami et al. |
| 2013/0091984 A1 * | 4/2013 | Pesola .................... B60K 6/36 74/661 |
| 2013/0112041 A1 | 5/2013 | Tamai et al. |
| 2013/0184111 A1 | 7/2013 | Tsuchida et al. |
| 2014/0011631 A1 | 1/2014 | Cimatti |
| 2014/0135162 A1 | 5/2014 | Wittkopp et al. |
| 2014/0283647 A1 * | 9/2014 | Blessing ................ B60K 6/42 74/661 |
| 2014/0373675 A1 * | 12/2014 | Kaltenbach ............ B60K 6/547 74/661 |
| 2016/0009269 A1 | 1/2016 | Zhou et al. |
| 2016/0137045 A1 | 5/2016 | Zhu et al. |
| 2016/0137048 A1 | 5/2016 | Zhu et al. |
| 2016/0137188 A1 | 5/2016 | Zhu et al. |
| 2016/0137189 A1 | 5/2016 | Zhu et al. |

FOREIGN PATENT DOCUMENTS

| | | |
|---|---|---|
| CN | 103072474 A | 5/2013 |
| CN | 103332100 A | 10/2013 |
| CN | 103552461 A | 2/2014 |
| EP | 1690723 A2 | 8/2006 |
| JP | 2009107626 A | 5/2009 |
| WO | 2008/138387 A1 | 11/2008 |

OTHER PUBLICATIONS

U.S. Appl. No. 14/947,979, filed Nov. 20, 2015, inventors: Hongxiang Leng, Wen Li, Jun Sun, Xinhua Jiang, Feifei Zhang, Sidong Luo, and Hailong Ge.

Joan-Adrian Viorel; et al.; Integrated Starter-Generators for Automotive Applications, ACTA Electrotehnica, vol. 45, No. 3, Sep. 2004, pp. 255-260.

Nate Martinez, Motor Trend Canada, First Drive: 2012 Infiniti M35 Hybrid—Fashionably Late: Infinity Finally RSVPs for Upscale Hybrid Party, Aug. 4, 2010, 18 pages.

Iskra Avtoelektrika d.d.; Integrated Starter Motor Generators; Mar. 2008, 8 pages.

* cited by examiner (a)

(b)

HYBRID-POWER DRIVING SYSTEM FOR A VEHICLE AND A TRANSMISSION THEREOF

CROSS REFERENCE TO RELATED APPLICATIONS

This application claims the benefit of priority to Chinese Patent Application No. 201410658499.5, filed Nov. 18, 2014, the contents of which are incorporated entirely herein by reference

BACKGROUND

Unless otherwise indicated herein, the elements described in this section, the technical field, and the background art are not prior art to the claims and are not admitted to be prior art by inclusion in this section.

A. Technical Field

This application relates to a vehicle hybrid-power driving system (HPDS). A vehicle HPDS described in this application can include synchronizers that are cooperatively switched and gearwheels that are shared in different gear ratios (i.e., speed ratios), an electric motor (or more simply, "EM"), and an internal combustion engine (or more simply, "engine" or "ICE").

B. Background Art

As the pollution of the environment, the demand for petroleum, and the requirements for vehicle emission equipment increase, vehicles with new power sources get more and more attention. Hybrid-power vehicles are widely used, at least in part, because of their low operating cost and low emissions. In known hybrid-power vehicles, the ICE, the clutch, the EM, and the transmission are disposed in sequence and occupy a large space in a vehicle. Deploying those hybrid-power vehicle components in such a layout can result in limiting the size of the EM, and as a result, limiting the power of the EM and the power capacity of the vehicle. As such, the fuel use efficiency cannot be improved significantly with respect to non-hybrid vehicles. Furthermore, the driving ability in a pure motor driving mode is not satisfying when the power of the EM is too low.

Furthermore still, in current vehicle hybrid-power driving systems, driving comfort cannot be ensured since power interruption cannot be avoided automatically in the configuration having a single clutch. In a known vehicle hybrid-power driving system, the EM and the ICE have their corresponding power transmitting mechanisms that are disposed in parallel and function cooperatively, which results in a vehicle hybrid power driving system having complex power transmitting paths.

Overview

This application describes several example embodiments, at least some of which pertain to a hybrid-power driving system (HPDS) and components thereof such as, but not limited to, transmissions and gearboxes, and methods of transmitting power through or within an HPDS and transmission.

In a first respect, an example embodiment can take the form of an HPDS comprising: (i) an input shaft carrying a first driving gearwheel, a second driving gearwheel, a third driving gearwheel, and a fourth driving gearwheel disposed thereon, (ii) a first synchronizer, disposed on the input shaft, for releasably synchronizing at least one of the first driving gearwheel and the second driving gearwheel to the input shaft, (iii) a second synchronizer, disposed on the input shaft, for releasably synchronizing at least one of the third driving gearwheel and the fourth driving gearwheel to the input shaft, (iv) an output shaft carrying a speed-reducing gearwheel, a first driven gearwheel, a second driven gearwheel, and a third driven gearwheel disposed thereon, (v) a first intermediate shaft carrying a fourth driven gearwheel and a fifth driven gearwheel disposed thereon, wherein the first intermediate shaft includes a hollow portion and is coaxial to the output shaft, (vi) a third synchronizer, disposed on the output shaft, for releasably synchronizing at least one of the first driven gearwheel and both the fourth driven gearwheel and the fifth driven gearwheel to the output shaft, (vii) a second intermediate shaft carrying a sixth driven gearwheel, a seventh driven gearwheel, an eighth driven gearwheel, and a ninth driven gearwheel disposed thereon, (viii) a motor shaft carrying a fifth driving gearwheel disposed thereon, (ix) and a final driven gearwheel.

In another respect, an example embodiment can take the form of an HPDS comprising: (i) an internal combustion engine (ICE), (ii) an electric motor, and (iii) a transmission including a set of gearwheels, multiple transmission shafts, a first synchronizer, a second synchronizer, and a third synchronizer, wherein the set of gearwheels includes multiple gearwheels that are used in multiple speed ratios available by shifting of the gearwheels, wherein each of the first synchronizer, the second synchronizer, and the third synchronizer are moveable axially to releasably engage at least two gearwheels from one of the transmission shafts, and wherein shifting of the gearwheels to achieve different speed ratios in a hybrid-power driving mode occurs without power interruption to a final driven gearwheel of the transmission.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

Figure 1:
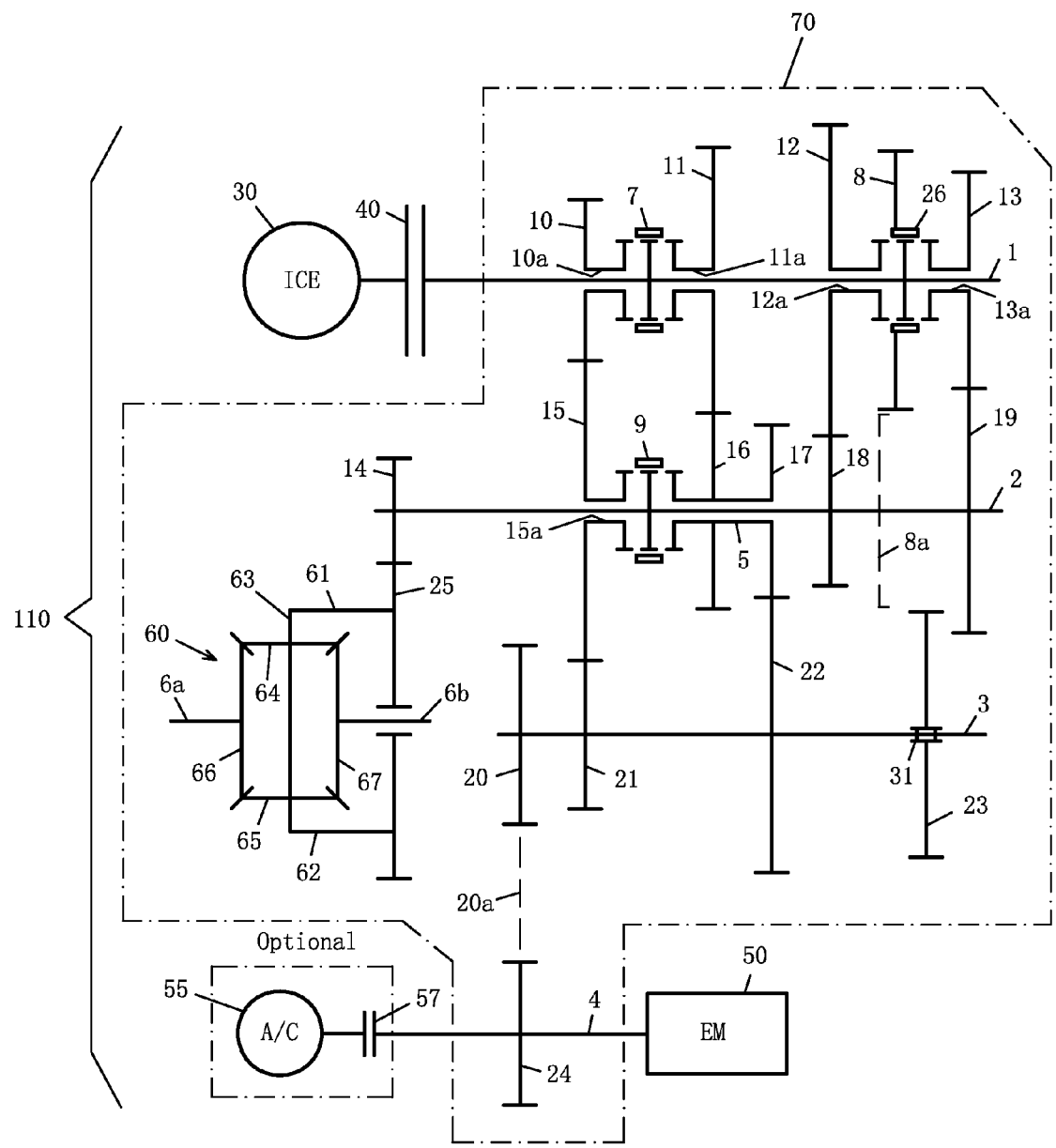
FIG. 1 is a schematic view of an HPDS in accordance with the example embodiments.

This description describes several example embodiments. The example embodiments can be applicable to an HPDS and components of or usable in an HPDS or usable in another type of driving system. A driving system, such as an HPDS or otherwise, can be installed within a vehicle such as, but not limited to, an automobile or a truck. An HPDS installed or installable within a vehicle can be referred to as a vehicle HPDS. Each example embodiment described herein can be a vehicle HPDS or a portion thereof, but is not so limited.

The example embodiments can provide for an HPDS that can provide a pure engine driving mode (PEDM), a pure motor driving mode (PMDM), and a hybrid-power driving mode (HDM). At least one of the power capacity and fuel efficiency of a vehicle can be improved significantly by use of at least one of the example embodiments. The HPDS can include synchronizers that are cooperatively switched and gearwheels that are used in in multiple speed ratios. This can provide for a compact structure of the transmission or gearbox and effective cooperation of an EM and an ICE in multiple speed ratios can be achieved. The HPDS can include a single clutch and gear shifting can be conducted without power interruption. Furthermore, power interruption during gear shifting can be avoided by alternate operation of the EM and the ICE. Stated another way, the transmission of the example HPDS with a single clutch can output power continuously while the gearwheels of the transmission are shifted such that the transmission outputs power continuously prior to, during, and after shifting of the transmission gearwheels.

In accordance with the example embodiments, an HPDS can include a transmission or gearbox having common gears that are shared in different speed ratios. The benefits of such a system include, but are not limited to, a reduced number of transmission components, a more compact structure, and a lower cost to produce the system. The transmission can be coupled to an ICE operable in the PEDM and the HDM and to an EM operable in the PMDM and the HDM.

In accordance with the example embodiments, the EM can provide four forward speed ratios. In this manner, the speed of the EM can be kept relatively low so that the EM can operate at higher efficiency levels. The ICE can operate under at least six forward speed ratios so that the operation efficiency of the ICE is high.

The example embodiments can include a single clutch transmission and a three synchronizer gearbox or transmission that provides for at least six forward speed ratios. The clutch can allow for shifting of gears without interrupting the transmission of power through the transmission and HPDS. A person having ordinary skill in the art will understand that the described example embodiments allow for a more compact HPDS arrangement as compared to an HPDS arrangement having at least one of (i) two or more clutches, and (ii) four or more synchronizers.

Within this description, the articles "a," "an," and "the" are used to introduce elements of the example embodiments. The intent of using those articles is that there is one or more of the elements. The intent of using the conjunction "or" within a list of at least two terms in this description is to indicate any of the listed terms or any combination of the listed terms. For example, in a list of terms recited as "A, B, or C," the combinations indicated by that list of terms include any one or more of "A and B," "A and C," "B, and C," and "A, B, and C." The use of ordinal numbers such as "first," "second," "third," and so on in the description is to distinguish respective elements rather than to denote a particular order of those elements unless the context of using those terms explicitly indicates otherwise.

The diagrams and power transmission paths shown in the figures are provided merely as examples and are not intended to be limiting. Those skilled in the art will appreciate that other arrangements of the elements shown in the figures can be used instead.

II. Example Hybrid-Power Driving Systems

FIG. 1 is a schematic view of an HPDS 110 in accordance with multiple example embodiments. In accordance with an example embodiment, the HPDS 110 includes a transmission 70. In accordance with another example embodiment, the HPDS 110 can include the transmission 70 and at least one of an ICE 30 and an EM 50. The EM 50 can rotate a motor shaft 4 of the transmission 70. The motor shaft 4 can, in turn, rotate a mechanical compressor 55 of an air conditioning system or a compressor clutch 57 thereof, but the motor shaft is not so limited. The motor shaft 4 can include splines for engaging a rotor (not shown) of the EM 50 and a driving gearwheel 24 on the motor shaft 4. HPDS 110 can be installed within a vehicle, such that HPDS 110 is a vehicle HPDS.

The ICE 30 and the EM 50 can each output power. The power (P) output by the ICE 30 can be calculated using the relationship $T_{ICE} \times W_{ICE}$, where $T_{ICE}$ equals the torque at the flywheel of the engine and $W_{ICE}$ equals an angular speed of the flywheel. The power (P) output by the EM 50 can be calculated using the relationship $T_{EM} \times W_{EM}$, where $T_{EM}$ equals the torque of a rotor within the EM 50 and $W_{EM}$ equals an angular speed of the rotor. The power output by the ICE 30 can be transmitted (e.g., transferred) to a clutch 40 and to an input shaft of the transmission 70, and, in turn, to wheels of a vehicle. The power output by the EM 50 can be output to the motor shaft of the transmission 70 and, in turn, to the wheels of the vehicle. The power received by the transmission 70 from the ICE 30 or the EM 50 can be referred to as input power. Since the power transmitted by the transmission 70 includes a torque aspect, the transmission of power through or by the transmission 70 can be referred to as the transmission of torque through or by the transmission 70.

The transmission 70 includes an input shaft 1, an output shaft 2, an intermediate shaft 3, a motor shaft 4, and an intermediate shaft 5. The five aforementioned shafts are referred to herein as the "five transmission shafts." The intermediate shaft 5 can include a hollow portion such that the intermediate shaft 5 can be slid onto the output shaft 2. The intermediate shaft 5 can be referred to as a "gear-set shaft," a "hollow shaft," and a "sleeve." The transmission 70 can include sleeves (i.e., hollow shafts) 10a, 11a, 12a, 13a, and 15a. Sleeves 10a, 11a, 12a, and 13a are carried by the input shaft 1. Sleeves 5 and 15a are carried by the intermediate shaft 4.

Each of the five transmission shafts can be mounted to, or at least partially within, a transmission case at locations that allow for gearwheels on those transmission shafts to mesh with at least one other gearwheel as described herein. Each of the five transmission shafts can be spatially arranged parallel with each other. The transmission case can form or include a gearbox within which gearwheels of the transmission 70 and at least a portion of the five transmission shafts are located. The EM 50 or a portion thereof can be located within the transmission case. Alternatively, the EM 50 can be located outside of the transmission case.

Each of the five transmission shafts can have a first shaft-end-portion and a second shaft-end-portion opposite the first shaft-end-portion axially (e.g., longitudinally). With reference to FIG. 1, the left-most shaft-end-portion of each of the five transmission shafts is referred to as a first shaft-end-portion of that shaft and the right-most shaft-end-portion of each of the five transmission shafts is referred to as a second shaft-end-portion of that shaft. The same designation of shaft-end-portions applies to any transmission shaft described herein or shown in any of the other figures.

The transmission 70 includes multiple driving gearwheels that drive at least one other gearwheel or causes at least one other gearwheel to turn. A driving gearwheel can be referred to as a "drive gearwheel." The transmission 70 includes multiple driven gearwheels. Each driven gearwheel can be driven by another gearwheel (e.g., driven by a driving gearwheel) or by a transmission shaft. One or more of the driving gearwheels described herein can act as a driven gearwheel for at least some of the power transmitting paths. For purposes of this description, the term "gearwheel" can be stated more simply as just "gear."

In an example embodiment of the HPDS 110 that includes the ICE 30, the input shaft 1 can be coupled to the ICE 30 by use of the clutch 40. As an example, the clutch 40 can include a pressure plate assembly, a throw-out bearing, a throw-our fork, and a clutch disk to engage a flywheel of the ICE 30, but the clutch 40 is not so limited. The clutch 40 can have an engaged state in which an output of the ICE 30 (e.g., the flywheel) is connected to the input shaft 1 (e.g., by way of the clutch disk). When viewed from a front side of the ICE 30 opposite a back side of the ICE 30 to which the flywheel is connected, the power or torque output by the ICE 30 can turn the clutch 40 in a clockwise direction. Other references herein to the ICE 30 or a shaft of the transmission 70 turning in a clockwise direction are considered from the same viewpoint. Clutch 40 can have a disengaged state in which the output of the ICE 30 is not connected to the input shaft 1.

The transmission 70 can include a driving gearwheel 10, a synchronizer 7, a driving gearwheel 11, a driving gearwheel 12, a synchronizer 26, and a driving gearwheel 13 disposed on the input shaft 1 in a sequence from left to right (e.g., from the first shaft-end-portion to the second shaft-end portion of the input shaft 1) as shown in FIG. 1, but are not so limited. For example, those four gearwheels can be in a different sequence between the first shaft-end-portion and the second shaft-end portion of the input shaft 1 so long as each of those gearwheels is positioned to mesh with the corresponding gearwheel(s) described herein as meshing with that gearwheel. Each of the driving gearwheel 10, the driving gearwheel 11, the driving gearwheel 12, and the driving gearwheel 13 is configured for engagement to the input shaft 1 by a synchronizer and is rotatably carried by the input shaft 1 or is rotatably carried by the sleeves 10*a*, 11*a*, 12*a*, and 13*a*, respectively. Any gearwheel, shaft, or synchronizer disposed on a given shaft is carried by the given shaft and is supported by the given shaft.

A gearwheel that is rotatably carried by a shaft is carried by the shaft and can rotate around the shaft (e.g., the gearwheel and the shaft are rotatable with respect to each other) when the gearwheel is not synchronized to the shaft (e.g., disengaged, uncoupled, or unlocked from the shaft). When the rotatably carried gearwheel is synchronized to the shaft by a synchronizer, the gearwheel is not rotatable around the shaft as the gearwheel and shaft are rotatable together.

In some instances, a gearwheel is fixedly carried by a shaft. A fixedly-carried gearwheel and the shaft which carries the gearwheel rotate together. In some instances, a gearwheel is slidably carried on a shaft. A slidably-carried gearwheel can be slid axially in two opposing directions along the shaft that carries the gearwheel.

Each synchronizer described herein can include a hub, a synchronizer sleeve, and two blocker rings, but is not so limited. A synchronizer can be configured as a block synchronizer, a cone synchronizer, a pin synchronizer, but is not so limited. Each synchronizer described herein can be moved axially along a shaft on which the synchronizer is disposed and carried. Axial movement of the synchronizer towards a gearwheel adjacent to the synchronizer can lead to synchronizing (i.e., engagement of or coupling of) the gearwheel and the shaft upon which the synchronizer and gearwheel are carried. Axial movement of the synchronizer away from a gearwheel adjacent to the synchronizer can lead to unsynchronizing (i.e., disengagement of or uncoupling of) the gearwheel and the shaft upon which the synchronizer and gearwheel are carried.

A gearwheel that synchronizes to a shaft by a synchronizer can rotate in the same direction and same speed as the shaft when the gearwheel is synchronized (i.e., engaged, coupled, or locked) to the shaft. Any description herein of a gearwheel being engaged to a synchronizer carried by a transmission shaft includes that gearwheel being engaged to (i.e., synchronized to, coupled to, or locked to) that transmission shaft. A gearwheel that synchronizes to a shaft by a synchronizer can rotate independent of the shaft when the gearwheel and the shaft are not synchronized (i.e., unsynchronized, uncoupled, or unlocked). Instead of using a single synchronizer to synchronize at least two gearwheels, two shafts, or a gear and shaft, separate synchronizers could be used to synchronize the multiple gearwheels or shafts.

The synchronizer 7 can be moved axially along the input shaft 1 by a shift fork or another mechanism. The synchronizer 7 can have (i) a first engaged position in which the synchronizer 7 keeps the driving gearwheel 10, but not the driving gearwheel 11, engaged to the input shaft 1, (ii) a second engaged position in which the synchronizer 7 keeps the driving gearwheel 11, but not the driving gearwheel 10, engaged to the first input shaft 1, and (iii) a neutral position in which neither of the driving gearwheel 10 and the driving gearwheel 11 is engaged to the first input shaft 1. The synchronizer 7 can be moved axially along the input shaft 1 away from a gearwheel adjacent to the synchronizer 7 so that the gearwheel disengages from the input shaft 1 and the synchronizer 7 moves into its neutral position. An "engaged position" can be referred to as a "synchronized position" or a "coupled position."

The synchronizer 26 can be moved axially along the input shaft 1 by a shift fork or another mechanism. The synchronizer 26 can have (i) a first engaged position in which the synchronizer 26 keeps the driving gearwheel 12, but not the driving gearwheel 13, engaged to the input shaft 1, (ii) a second engaged position in which the synchronizer 26 keeps the driving gearwheel 13, but not the driving gearwheel 12, engaged to the first input shaft 1, and (iii) a neutral position in which neither of the driving gearwheel 12 and the driving gearwheel 13 is engaged to the first input shaft 1. The synchronizer 26 can be moved axially along the input shaft 1 away from a gearwheel adjacent to the synchronizer 26 so that the gearwheel disengages from the input shaft 1 and the synchronizer 26 moves into its neutral position. The synchronizer 26 can include a driving gearwheel 8. The driving gearwheel 8 can be disposed on a sliding sleeve of the synchronizer 26, but is not so limited. FIG. 1 illustrates a relative position 8*a* of driving gearwheel 8 such that driven gearwheel 23 can be slid to engage to the driving gearwheel 8.

The transmission 70 can include a speed-reducing gearwheel 14, a driven gearwheel 15, a synchronizer 9, the intermediate shaft 5, a driven gearwheel 18 and a driven gearwheel 19 disposed on the output shaft 2 in a sequence from left to right (e.g., from the first shaft-end-portion to the second shaft-end portion of the output shaft 2) as shown in FIG. 1, but are not so limited. For example, those four gearwheels on output shaft 2 can be in a different sequence between the first shaft-end-portion and the second shaft-end portion of the output shaft 2 so long as each of those gearwheels is positioned to mesh with the corresponding gearwheel(s) described herein as meshing with that gearwheel.

The synchronizer 9 can be moved axially along the output shaft 2 by a shift fork or another mechanism. The synchronizer 9 can have (i) a first engaged position in which the synchronizer 9 keeps the driven gearwheel 15, but not the intermediate shaft 5 and the gearwheels disposed thereon, engaged to the output shaft 2, (ii) a second engaged position in which the synchronizer 9 keeps the intermediate shaft 5 and the gearwheels disposed thereon, but not the driven gearwheel 15, engaged to the output shaft 2, and (iii) a neutral position in which neither of the driven gearwheel 15 and the intermediate shaft 5 is engaged to the output shaft 2. In this second engaged position, the synchronizer 9 can engage directly to the driven gearwheel 16 or to the intermediate shaft 5. The synchronizer 9 can be moved axially along the output shaft 2 away from a gearwheel adjacent to the synchronizer 9 so that the gearwheel disengages from the output shaft 2 and the synchronizer 9 moves into its neutral position.

The transmission 70 can include a driven gearwheel 20, a driven gearwheel 21, a driven gearwheel 22, and a driven gearwheel 23 disposed on the intermediate shaft 3. Those four gearwheels can be disposed on the intermediate shaft 3 in a sequence from left to right (e.g., from the first shaft-end-portion to the second shaft-end portion) of the intermediate shaft 3 as shown in FIG. 1, but are not so limited. For example, those four gearwheels can be in a different sequence between the first shaft-end-portion and the second shaft-end portion of the intermediate shaft 3 so long as each of those gearwheels is positioned to mesh with the corresponding gearwheel(s) described herein as meshing with that gearwheel. Driven gearwheel 23 can be carried by a sleeve 31 that is disposed on and slidable axially along the intermediate shaft 3.

The transmission 70 can include a driven gearwheel 16 and a driven gearwheel 17 disposed on the intermediate shaft 5 in a sequence from left to right (e.g., from the first shaft-end-portion to the second shaft-end portion) of the intermediate shaft 5 as shown in FIG. 1, but are not so limited. For example, those two gearwheels on intermediate shaft 5 can be in a different sequence between the first shaft-end-portion and the second shaft-end portion of the intermediate shaft 5 so long as each of those gearwheels is positioned to mesh with the corresponding gearwheel(s) described herein as meshing with that gearwheel.

The transmission 70 can include a driving gearwheel 24 disposed on the motor shaft 4. Compressor 55 can be releasably coupled to the motor shaft 4 by clutch 57.

The transmission 70 can include a differential 60. The differential 60 can include a final driven gearwheel 25 and differential half-axles (output shafts) 6a and 6b. The differential 60 can include a pair of carriers 61, 62 fixed to the final driven gearwheel 25, a shaft 63 rotatably carried by the pair of carriers 61, 62, a pair of first gearwheels 64, 65 mounted to the shaft 63, a pair of second gearwheels 66, 67 each meshing with the first gearwheels 64, 65, and the differential half-axles 6a and 6b extending from the second gearwheels 66, 67 respectively. The differential half-axles 6 can be connected to vehicle wheels. The pair of carriers 61 and 62 can be configured as a single carrier fixed to the final driven gearwheel 25, but is not so limited. Each of the first gearwheels 64 and 65 can be referred to as a spider gear. Each of the second gearwheels 66 and 67 can be referred to as a side gearwheel. The differential 60 can include a differential case (not shown). The final driven gearwheel 25, as well as one or more other components of the differential 60, can be carried by or within the differential case.

Figure 2:
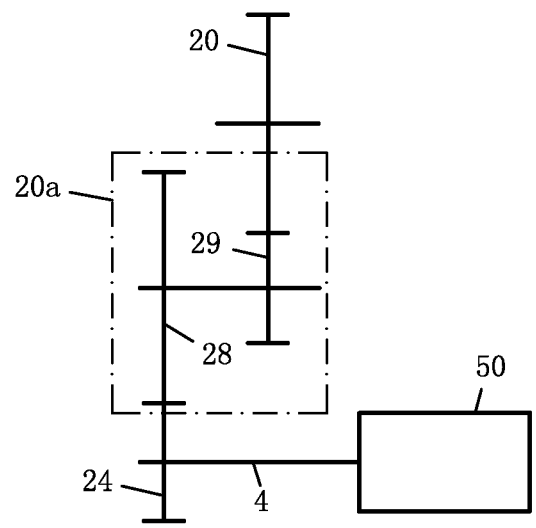
FIG. 2 is a schematic view of the structure of motor drives in accordance with the example embodiments.
Figure 2:
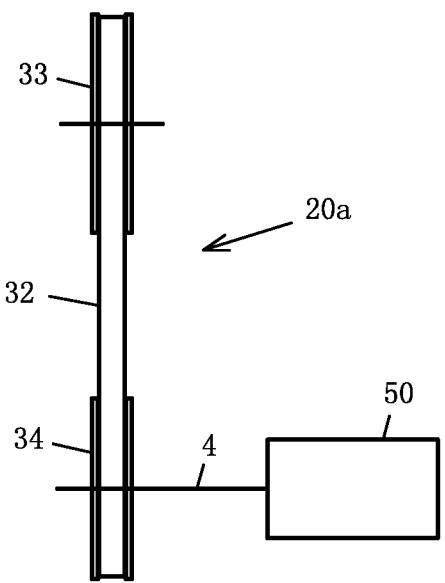

The transmission 70 can include a motor drive 20a for transferring power to or from the EM 50. As shown in FIG. 2a, the motor drive 20a can be arranged as a gear set for transmitting power or torque from driving gearwheel 24 to driven gearwheel 20. That gear set includes a driven gearwheel 28 and a driven gearwheel 29, but is not so limited. Alternatively, as shown in FIG. 2b, the motor drive 20a can be arranged as a belt or chain 32 and a belt pulley or sprocket 33 and a belt pulley or sprocket 34 are substituted for driven gearwheel 20 and driving gearwheel 24, respectively.

The aforementioned gearwheels and synchronizers can be referred to by alternative names. Table 1 shows alternative gearwheel and synchronizer names for the gearwheels and synchronizers of the transmission 70. Other examples of alternative names are also possible. Table 1 also identifies gearwheels that mesh with other gearwheels of the transmission 70.

TABLE 1

| Gearwheel/Synchronizer (Drawing Reference Number) | Alternative names for Gearwheel/Synchronizer | Meshing Gearwheels |
|---|---|---|
| Synchronizer (7) | Second-and-fourth-speed-ratio synchronizer | 10, 11 |
| Driving gearwheel (8) | Gearwheel | 23 (Slidable) |
| Synchronizer (9) | Synchronizer | 15, 16 |
| Driving gearwheel (10) | Second-speed-ratio driving gearwheel | 15 |
| Driving gearwheel (11) | Fourth-speed-ratio driving gearwheel | 16 |
| Driving gearwheel (12) | Fifth-speed-ratio driving gearwheel | 18 |
| Driving gearwheel (13) | Third-speed-ratio driving gearwheel | 19 |
| Speed-reducing gearwheel (14) | Speed-reducing gearwheel | 25 |
| Driven gearwheel (15) | Second-speed-ratio driven gearwheel | 10, 21 |
| Driven gearwheel (16) | Fourth-speed-ratio driven gearwheel | 11 |
| Driven gearwheel (17) | Gearwheel | 22 |
| Driven gearwheel (18) | Fifth-speed-ratio driven gearwheel | 12 |
| Driven gearwheel (19) | Third-speed-ratio driven gearwheel | 13 |
| Driven gearwheel (20) | Gearwheel | 29 |
| Driven gearwheel (21) | Gearwheel | 15 |
| Driven gearwheel (22) | Gearwheel | 17 |
| Driven gearwheel (23) | Reverse-gear driven gearwheel | 8 (When gearwheel 23 slid to engage) |
| Driving gearwheel (24) | Drive gearwheel | 28 |
| Final driven gearwheel (25) | Tenth driven gearwheel or Ring gearwheel | 14 |
| Synchronizer (26) | Third-and-fifth-speed-ratio-and-reverse synchronizer | 12, 13 |
| Driven gearwheel (28) | Gearwheel | 24 |
| Driven gearwheel (29) | Gearwheel | 20 |

The gearwheels of the example embodiments can have various characteristics. For example, each of the gearwheels described herein can comprise a helical gearwheel (such as a helical cylindrical gearwheel), but is not so limited. Table 2 includes data indicating additional example characteristics of the various gearwheels of the transmission 70. A person having ordinary skill in the art will understand that other examples of the identified characteristics are also possible.

TABLE 2

| Gearwheel | Slidable on shaft (Shaft No.) | Rotatably carried on shaft (Shaft No.) | Fixedly carried on shaft (Shaft No.) |
|---|---|---|---|
| Driving gearwheel (8) | No | No | Yes (1 - on synchronizer 26) |
| Driving gearwheel (10) | No | Yes (1) | No |
| Driving gearwheel (11) | No | Yes (1) | No |
| Driving gearwheel (12) | No | Yes (1) | No |
| Driving gearwheel (13) | No | Yes (1) | No |
| Speed-reducing gearwheel (14) | No | No | Yes (2) |
| Driven gearwheel (15) | No | Yes (2) | No |
| Driven gearwheel (16) | No | No | Yes (5) |
| Driven gearwheel (17) | No | No | Yes (5) |
| Driven gearwheel (18) | No | No | Yes (2) |
| Driven gearwheel (19) | No | No | Yes (2) |
| Driven gearwheel (20) | No | No | Yes (3) |
| Driven gearwheel (21) | No | No | Yes (3) |
| Driven gearwheel (22) | No | No | Yes (3) |
| Driven gearwheel (23) | Yes (3) | No | No |
| Driving gearwheel (24) | No | No | Yes (4) |
| Final driven gearwheel (25) | No | No | No |
| Driven gearwheel (28) | No | No | Yes (27) |
| Driven gearwheel (29) | No | No | Yes (27) |

In accordance with the example embodiments, gear shifting and gear selection can be achieved manually or automatically. Those shifting and selection actions performed automatically can occur electrically, hydraulically, or a combination of electrically and hydraulically. With respect to electrical gear shifting or selection, an electric motor other than the EM 50 can be used to perform the gear shifting or selection by moving a shift fork to slide a synchronizer axially along a shaft.

III. Power Transmitting Paths for Example HPDS

The HPDS 110 can have one or more driving modes. Those driving modes can include at least one of (i) a pure engine driving mode (PEDM) in which the ICE 30 is the acting power source for the HPDS 110, (ii) a pure motor driving mode (PMDM) in which the EM 50 is the acting power source for the HPDS 110, and (iii) a hybrid-power driving mode (HPDM) in which both the ICE 30 and the EM 50 are the acting power sources for the HPDS 110.

The HPDS 110 and the transmission 70 can provide multiple power transmitting paths for each of the aforementioned driving modes. Examples of those power transmitting paths are described below. For each of the power transmitting paths of the PEDM and the HPDM, the clutch 40 is in the engaged state such that the power of the ICE 30 is transmitted to the input shaft 1 by the clutch 40. For each of the power transmitting paths of the PMDM, the clutch 40 is in the disengaged state such that any power available from the ICE 30 is not transmitted to the input shaft 1 by the clutch 40 or the ICE 30 is not outputting power. Shifting the transmission 70 from any speed ratio to another speed ratio in the PEDM and HPDM can include the ICE 30 and the input shaft 1 being disengaged from one another by the clutch 40 so that axial movement of one or more of the synchronizers can be moved axially to allow for engagement and disengagement (i.e., synchronizing and unsynchronizing) of one or more gearwheels as described below.

The axial movement of any of the synchronizers described herein to synchronize to a gearwheel can include that gearwheel synchronizing to the shaft on which the synchronizer is carried such that the gearwheel and that shaft rotate at the same speed.

The power transmitting paths discussed herein refer to forward speed ratios and reverse speed ratios. The power output by the half-axles 6a and 6b for the forward speed ratios can cause the half-axles, and wheels attached thereto, to turn in a first driving direction (e.g., a forward driving direction). The power output by the half-axles 6a and 6b for the reverse speed ratios can cause the half-axles 6a and 6b, and wheels attached thereto, to turn in a second driving direction (e.g., a reverse driving direction) opposite the first driving direction. The driven gearwheel 23 is not meshed with the driving gearwheel 8 for the forward speed ratios.

A. Power Transmitting Paths—Pure Engine Driving Mode (PEDM)

1. First Forward Speed Ratio (PEDM)

Figure 3:
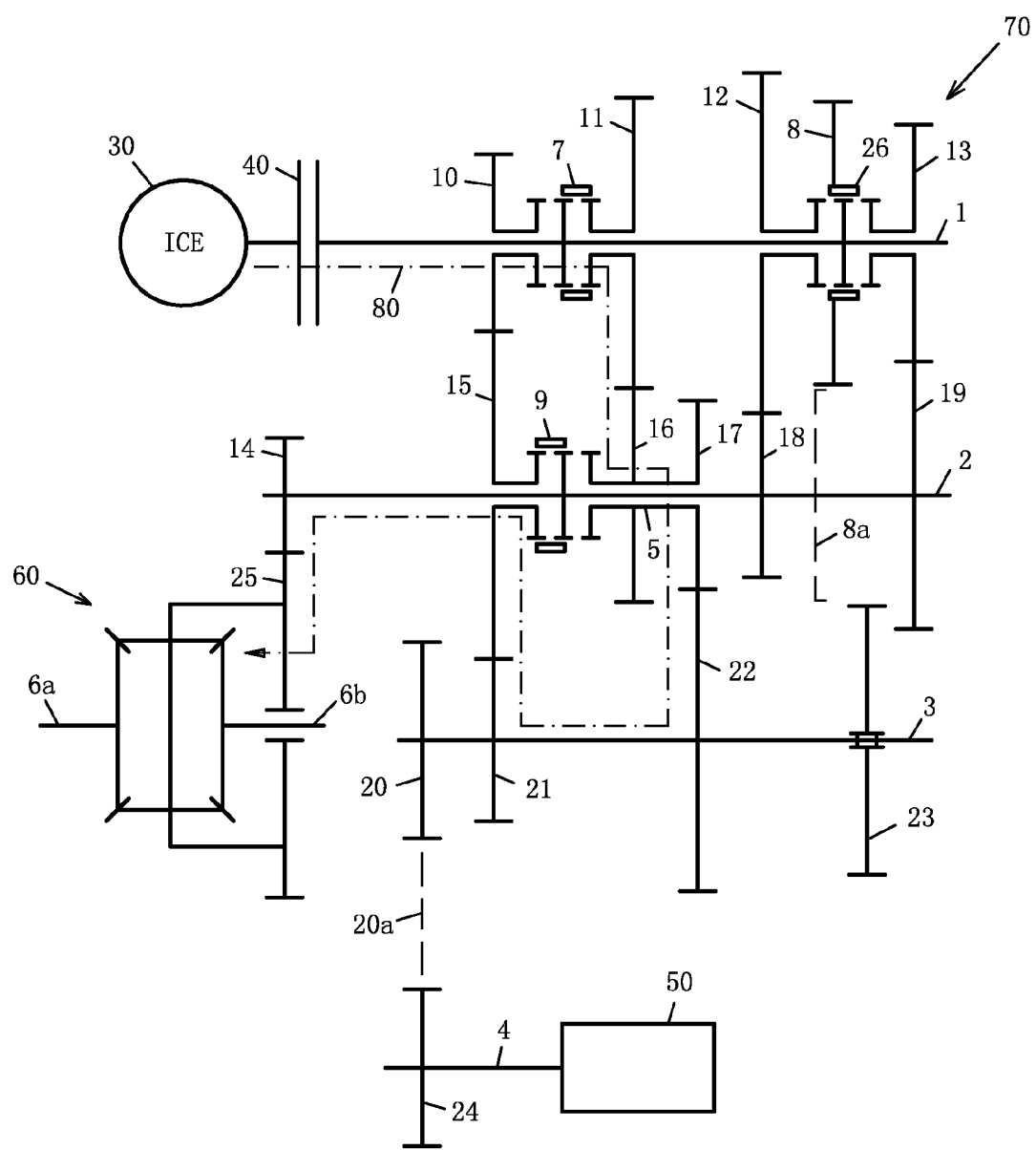
FIGS. 3-23 are schematic views showing power transmitting paths of the HPDS of FIG. 1.

FIG. 3 shows a power transmitting path 80 that the HPDS 110 and the transmission 70 can provide for a first forward speed ratio while operating in the PEDM. The power transmitting path 80 can be achieved when (i) the clutch 40 is in an engaged state such that the ICE 30 is coupled to the input shaft 1, (ii) the synchronizer 7 is engaged to the driving gearwheel 11, (iii) the synchronizer 9 is engaged to the driven gearwheel 15, and (iv) the synchronizer 26 is in its neutral position. Shifting the transmission 70 into this first forward speed ratio can include at least one of the following: forcing the synchronizer 7 to move axially to engage to the driving gearwheel 11, forcing the synchronizer 26 to move axially into its neutral position, and forcing the synchronizer 9 to move axially to engage to the driven gearwheel 15. Forcing a synchronizer or gearwheel to move axially can occur by activation of an electronic solenoid, activation of a hydraulic valve, or by another process.

For the first forward speed ratio in the PEDM, the power output by the ICE 30 is transmitted in sequence through the driving gearwheel 11 on the input shaft 1, the driven gearwheel 16 on the intermediate shaft 5, the driven gearwheel 17 on the intermediate shaft 5, the driven gearwheel 22 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel (not shown) connectable thereto.

2. Second Forward Speed Ratio (PEDM)

Figure 4:
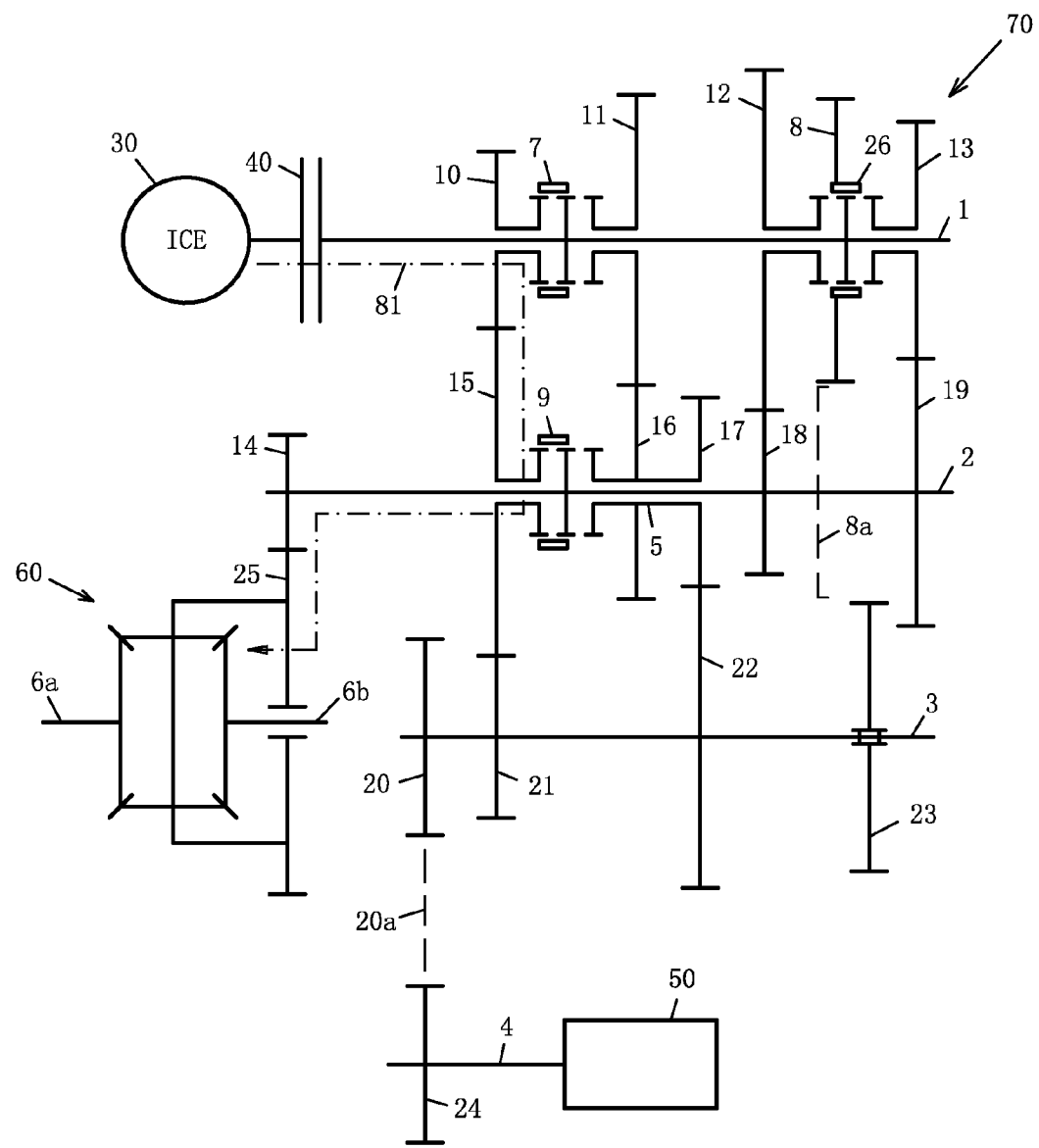

FIG. 4 shows a power transmitting path 81 that the HPDS 110 and the transmission 70 can provide for a second forward speed ratio while operating in the PEDM. The power transmitting path 81 can be achieved when (i) the clutch 40 is in an engaged state such that ICE 30 is coupled to the input shaft 1, (ii) the synchronizer 7 is engaged to the driving gearwheel 10, (iii) the synchronizer 9 is engaged to the driven gearwheel 15, and (iv) the synchronizer 26 is in its neutral position. Shifting the transmission 70 into this second forward speed ratio can include at least one of the following: forcing the synchronizer 7 to move axially to engage to the driving gearwheel 10, forcing the synchronizer 26 to move axially into its neutral position, and forcing the synchronizer 9 to move axially to engage to the driven gearwheel 15.

For the second forward speed ratio in the PEDM, the power output by the ICE 30 is transmitted in sequence through the driving gearwheel 10 on the input shaft 1, the driven gearwheel 15 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

3. Third Forward Speed Ratio (PEDM)

Figure 5:
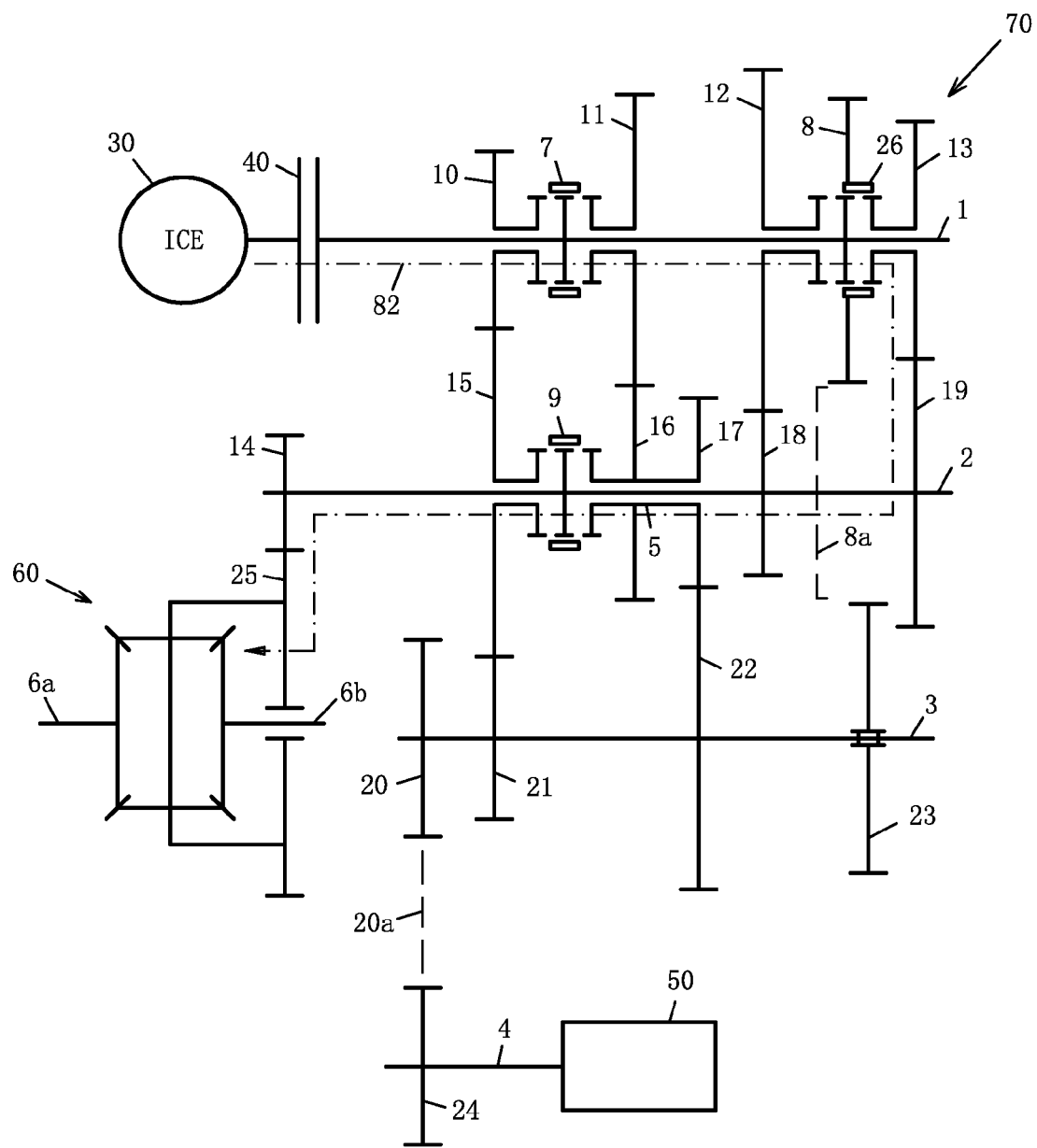

FIG. 5 shows a power transmitting path 82 that the HPDS 110 and the transmission 70 can provide for a third forward speed ratio while operating in the PEDM. The power transmitting path 82 can be achieved when (i) the clutch 40 is in an engaged state such the that ICE 30 is coupled to the input shaft 1, (ii) the synchronizer 7 and the synchronizer 9 are in their neutral position, and (iii) the synchronizer 26 is engaged to the driving gearwheel 13. Shifting the transmission 70 into this third forward speed ratio can include at least one of the following: forcing the synchronizer 7 to move axially into its neutral position, forcing the synchronizer 26 to move axially to engage the fourth driving gear wheel 13, and forcing the synchronizer 9 to move axially into its neutral position.

For the third forward speed ratio in the PEDM, the power output by the ICE 30 is transmitted in sequence through the third-speed-ratio driving gear 13 on the input shaft 1, the third-speed-ratio driven gear 19 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

4. Fourth Forward Speed Ratio (PEDM)

Figure 6:
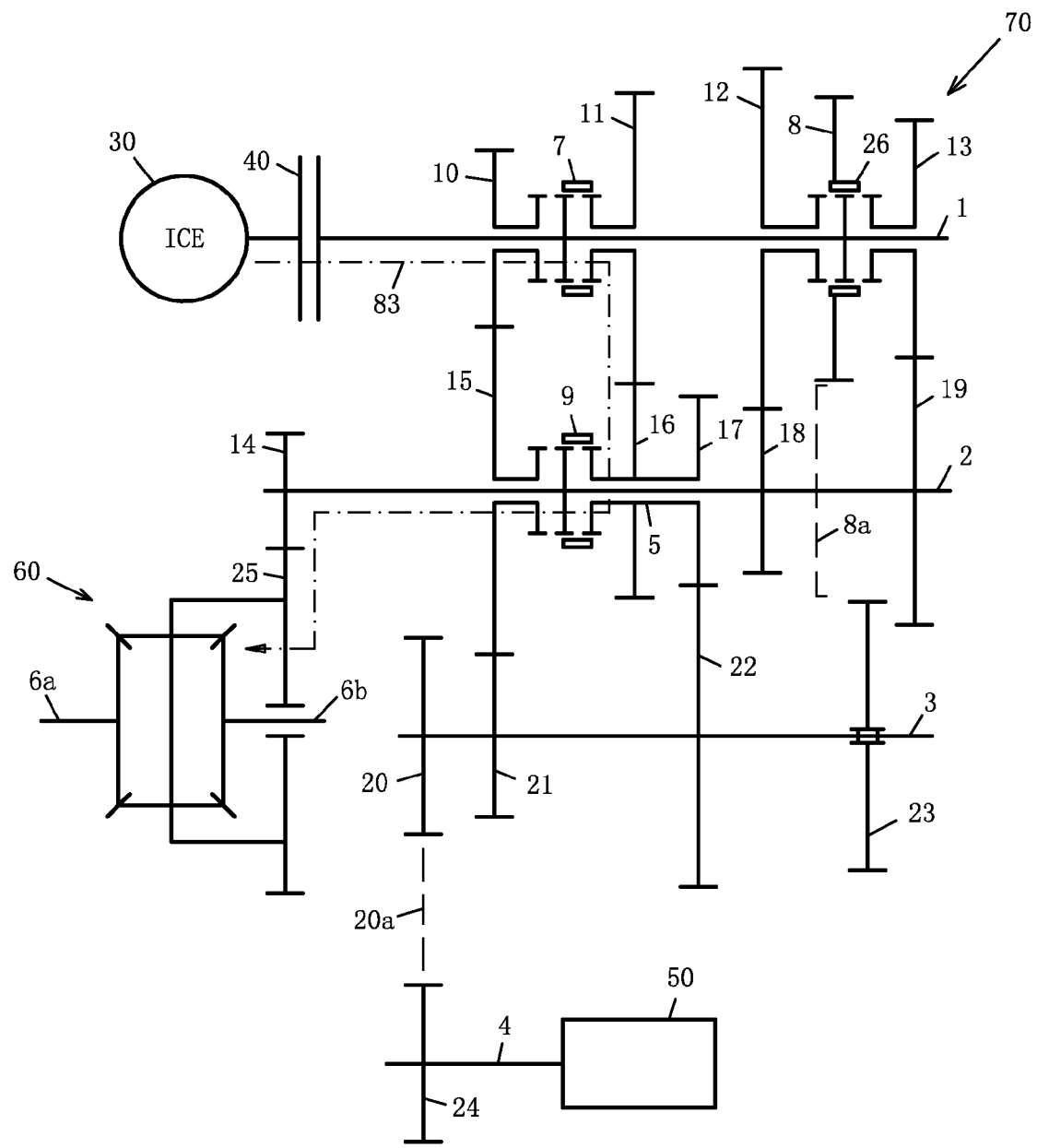

FIG. 6 shows a power transmitting path 83 that the HPDS 110 and the transmission 70 can provide for a fourth forward speed ratio while operating in the PEDM. The power transmitting path 83 can be achieved when (i) the clutch 40 is in an engaged state such that ICE 30 is coupled to the input shaft 1, (ii) the synchronizer 7 is engaged to the driving gearwheel 11, (iii) the synchronizer 9 is engaged to the driven gearwheel 16, and (iv) the synchronizer 26 is in its neutral position. Shifting the transmission 70 into this fourth forward speed ratio can include at least one of the following: forcing the synchronizer 7 to move axially to engage to the driving gearwheel 11, forcing the synchronizer 26 to move axially into its neutral position, and forcing the synchronizer 9 to move axially to engage to the driven gearwheel 16.

For the fourth forward speed ratio in the PEDM, the power output by the ICE 30 is transmitted in sequence through the driving gearwheel 11 on the input shaft 1, the driven gearwheel 16, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

5. Fifth Forward Speed Ratio (PEDM)

Figure 7:
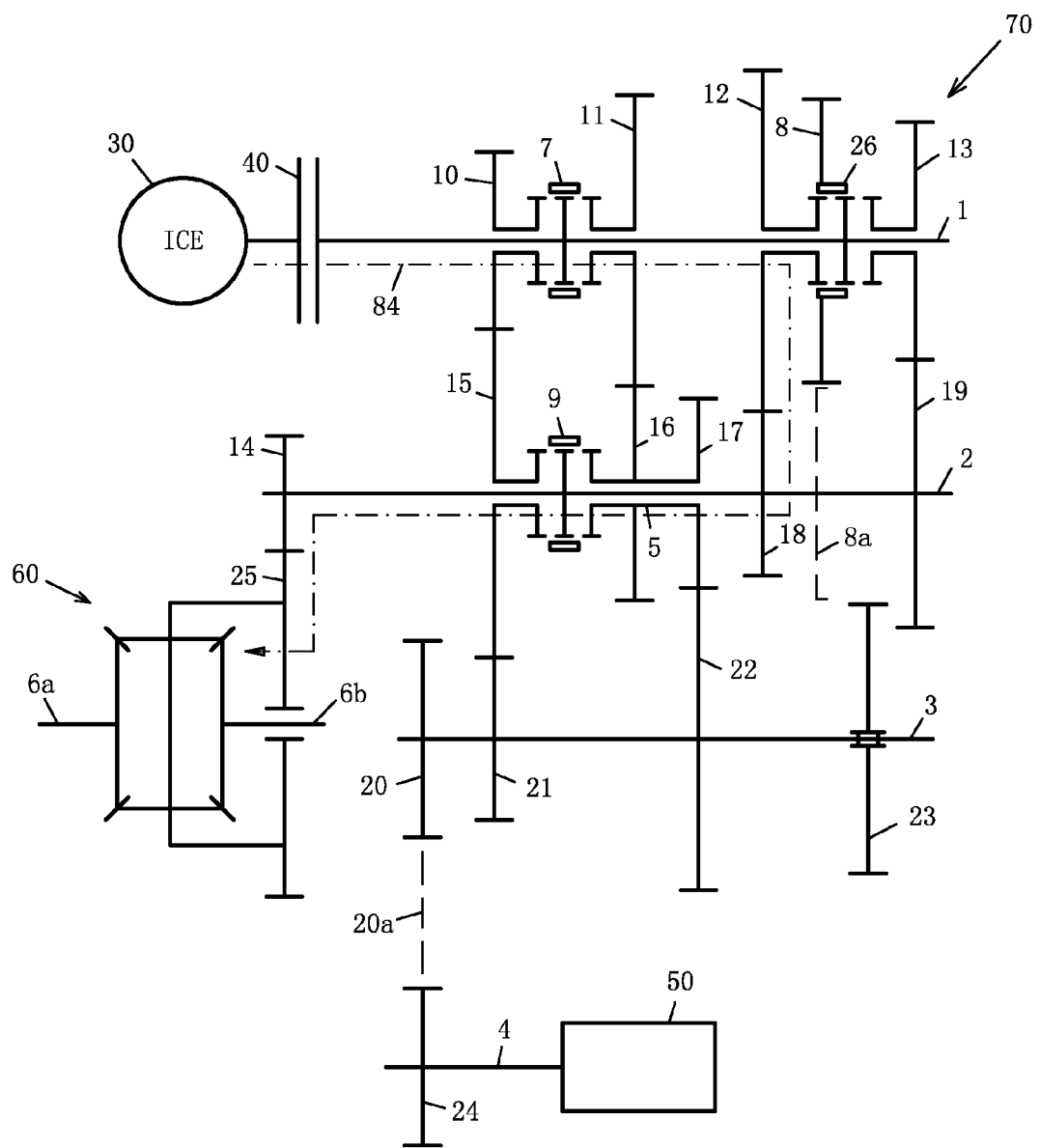

FIG. 7 shows a power transmitting path 84 that the HPDS 110 and the transmission 70 can provide for a fifth forward speed ratio while operating in the PEDM. The power transmitting path 84 can be achieved when (i) the clutch 40 is in an engaged state such that ICE 30 is coupled to the input shaft 1, (ii) the synchronizer 26 is engaged to the driving gearwheel 12, and (iii) the synchronizer 7 and the synchronizer 9 are in their neutral position. Shifting the transmission 70 into this fifth forward speed ratio can include at least one of the following: forcing the synchronizer 7 to move axially into its neutral position, forcing the synchronizer 26 to move axially to engage to the driving gearwheel 12, and forcing the synchronizer 9 to move axially into its neutral position.

For the fifth forward speed ratio in the PEDM, the power output by the ICE 30 is transmitted in sequence through the driving gearwheel 12 on the input shaft 1, the driven gearwheel 18 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

6. Sixth Forward Speed Ratio (PEDM)

Figure 8:
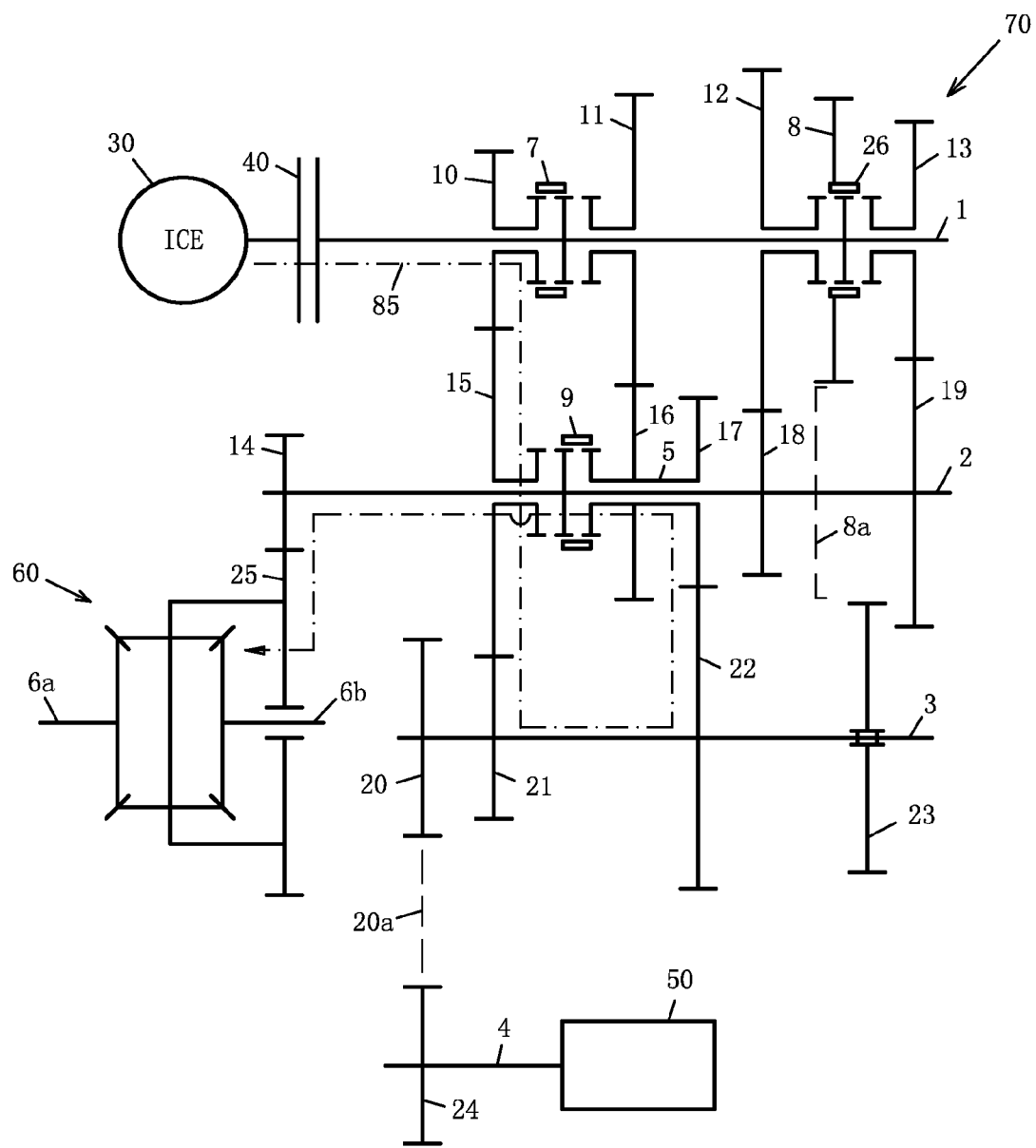

FIG. 8 shows a power transmitting path 85 that the HPDS 110 and the transmission 70 can provide for a sixth forward speed ratio while operating in the PEDM. The power transmitting path 85 can be achieved when (i) the clutch 40 is in an engaged state such that ICE 30 is coupled to the input shaft 1, (ii) the synchronizer 7 is engaged to the driving gearwheel 10, (iii) the synchronizer 26 is in its neutral position, and (iv) the synchronizer 9 is engaged to the driven gearwheel 16. Shifting the transmission 70 into this sixth forward speed ratio can include at least one of the following: forcing the synchronizer 7 to move axially to engage to the driving gearwheel 10, forcing the synchronizer 26 to move axially into its neutral position, and forcing the synchronizer 9 to engage to the driven gearwheel 16.

For the sixth forward speed ratio in the PEDM, the power output by the ICE 30 is transmitted in sequence through the driving gearwheel 10 on the input shaft 1, the driven gearwheel 15 on the output shaft 2, the driven gearwheel 21 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

7. Reverse Speed Ratio (PEDM)

Figure 9:
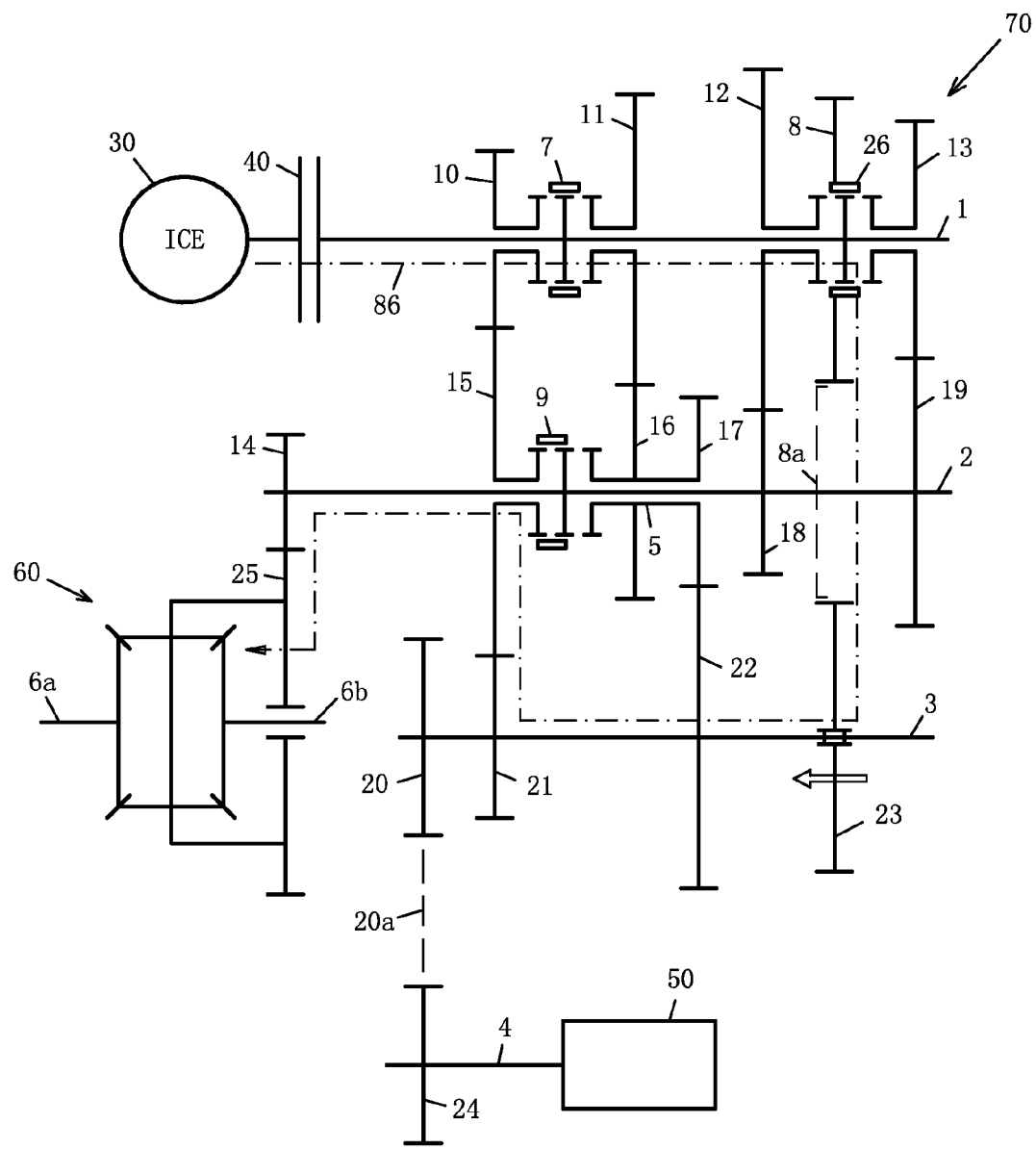

FIG. 9 shows a power transmitting path 86 that the HPDS 110 and the transmission 70 can provide for a reverse speed ratio while operating in the PEDM. The power transmitting path 86 can be achieved when (i) the clutch 40 is in an engaged state such that ICE 30 is coupled to the input shaft 1, (ii) the synchronizer 7 is in its neutral position, (iii) the synchronizer 26 is in its neutral position, (iv) the synchronizer 9 is engaged to the driven gearwheel 15, and (v) the driven gearwheel 23 is engaged to the driving gearwheel 8. Shifting the transmission 70 for this reverse speed ratio can include at least one of the following: forcing the synchronizer 7 to move axially into its neutral position, forcing the synchronizer 26 to move axially into its neutral position, forcing the synchronizer 9 to move axially to engage to the driven gearwheel 15, and forcing the driven gearwheel 23 to move axially to engage to the driving gearwheel 8.

For the reverse speed ratio in the PEDM, the power output by the ICE 30 is transmitted in sequence through the driving gearwheel 8 on the synchronizer 26, the driven gearwheel 23 on the intermediate shaft 2, the driven gearwheel 21 on the intermediate shaft 2, the driven gearwheel 15 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

B. Power Transmitting Paths—Pure Motor Driving Mode (PMDM)

1. First Forward Speed Ratio (PMDM)

Figure 10:
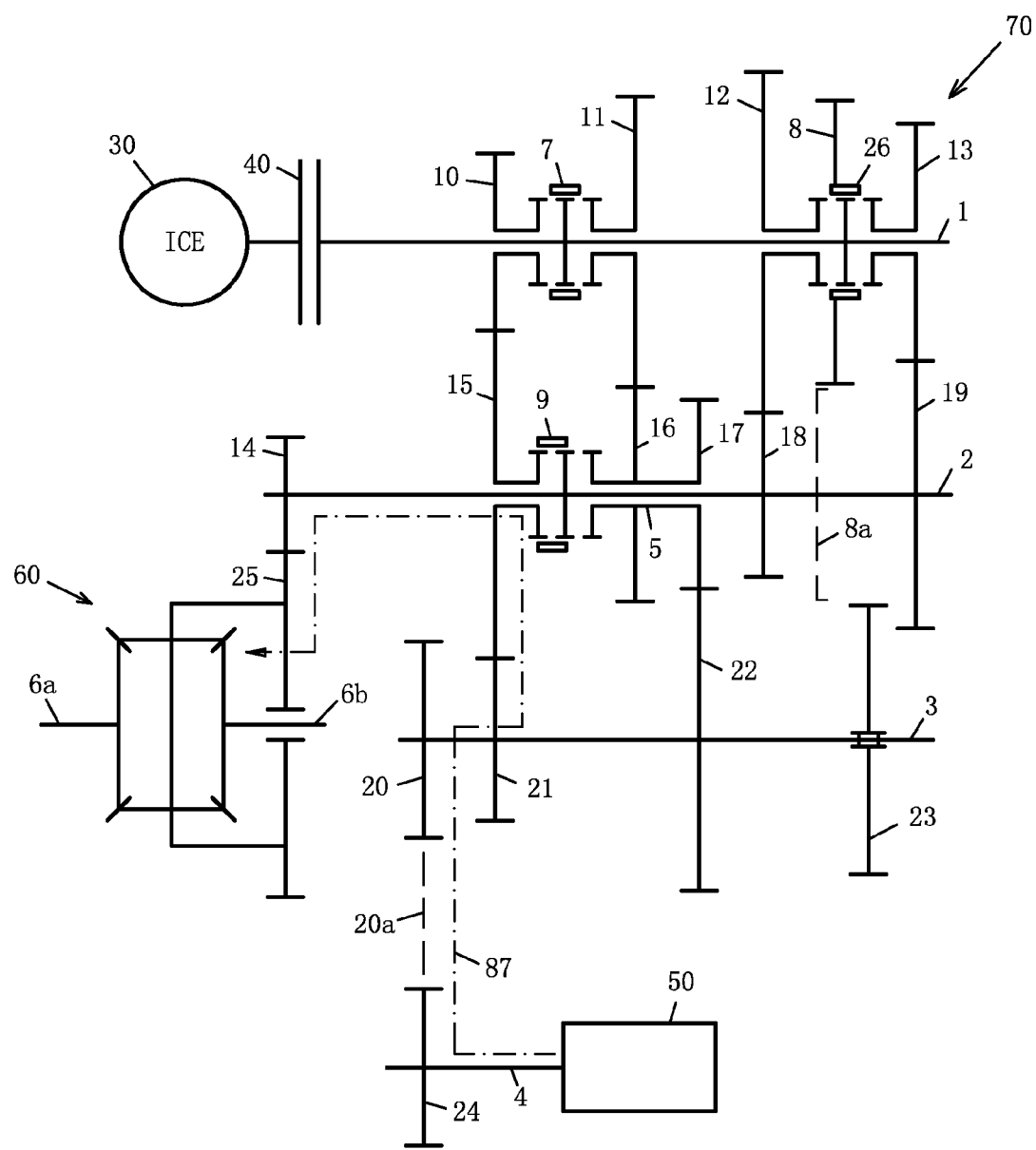

FIG. 10 shows a power transmitting path 87 that the HPDS 110 and the transmission 70 can provide for a first forward speed ratio while operating in the PMDM. The power transmitting path 87 can be achieved when (i) the synchronizer 7 and the synchronizer 26 are in their neutral position, and (ii) the synchronizer 9 is engaged to the driven gearwheel 15. Furthermore, the clutch 40 can be disengaged such that the ICE 30 is not coupled to the input shaft 1 or the ICE 30 is not outputting power. Shifting the transmission 70 into this first forward speed ratio can include at least one of the following: forcing the synchronizer 7 to move axially into its neutral position, forcing the synchronizer 26 to move axially into its neutral position, and forcing the synchronizer 9 to engage to the driven gearwheel 15.

For the first forward speed ratio in the PMDM, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

2. Second Forward Speed Ratio (PMDM)

Figure 11:
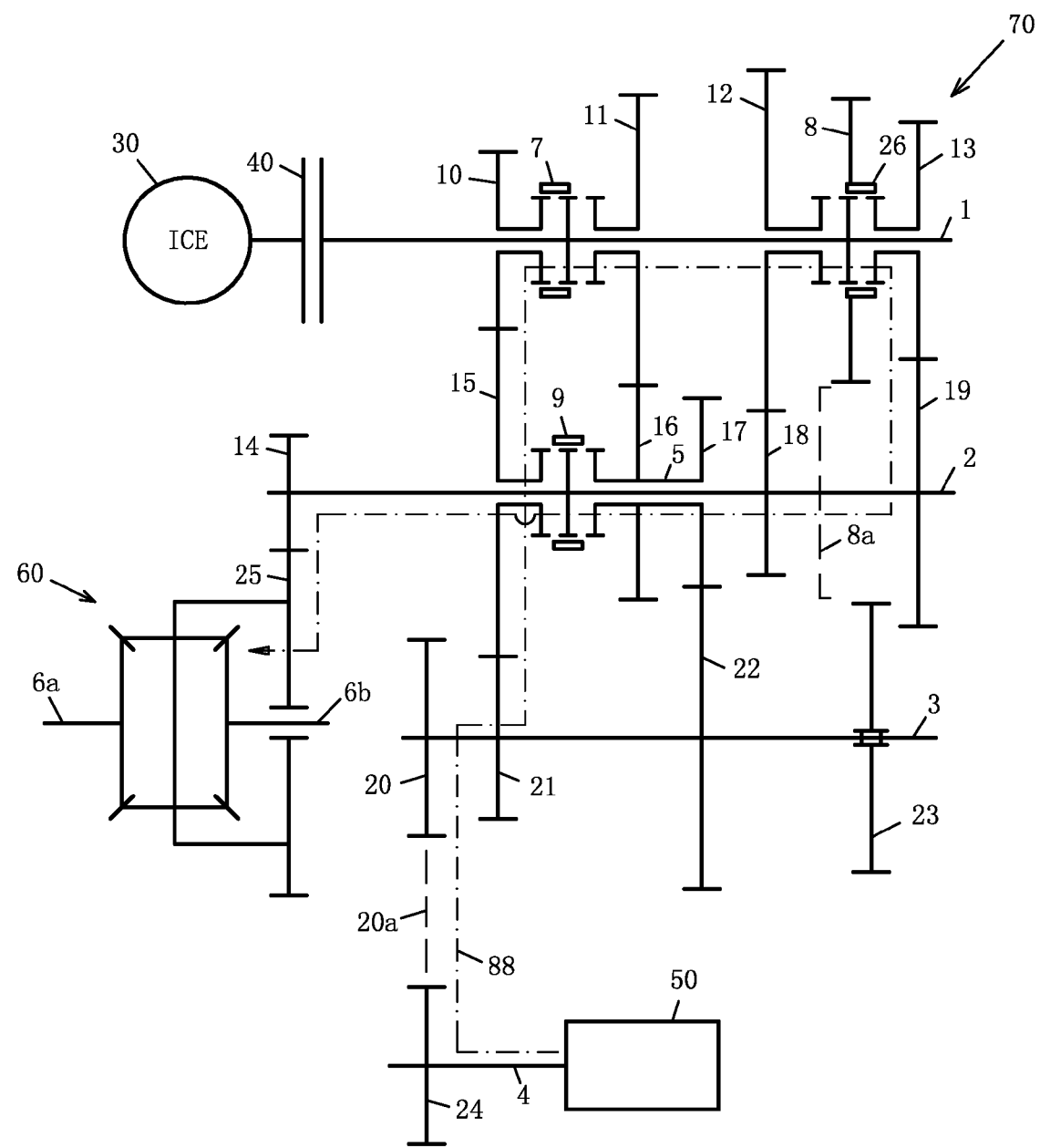

FIG. 11 shows a power transmitting path 88 that the HPDS 110 and the transmission 70 can provide for a second forward speed ratio while operating in the PMDM. The power transmitting path 88 can be achieved when (i) the synchronizer 7 is engaged to the driving gearwheel 10, (ii) the synchronizer 26 is engaged to the driving gearwheel 13, and (iii) the synchronizer 9 is in its neutral position. Furthermore, the clutch 40 can be disengaged such that the ICE 30 is not coupled to the input shaft 1 or the ICE 30 is not outputting power. Shifting the transmission 70 into this second forward speed ratio can include at least one of the following: forcing the synchronizer 7 to move axially to engage to the driving gearwheel 10, forcing the synchronizer 26 to move axially to engage to the driving gearwheel 13, and forcing the synchronizer 9 to move axially into its neutral position.

For the second forward speed ratio in the PMDM, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the driving gearwheel 10, the driving gearwheel 13 on the input shaft 1, the driven gearwheel 19 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

3. Third Forward Speed Ratio (PMDM)

Figure 12:
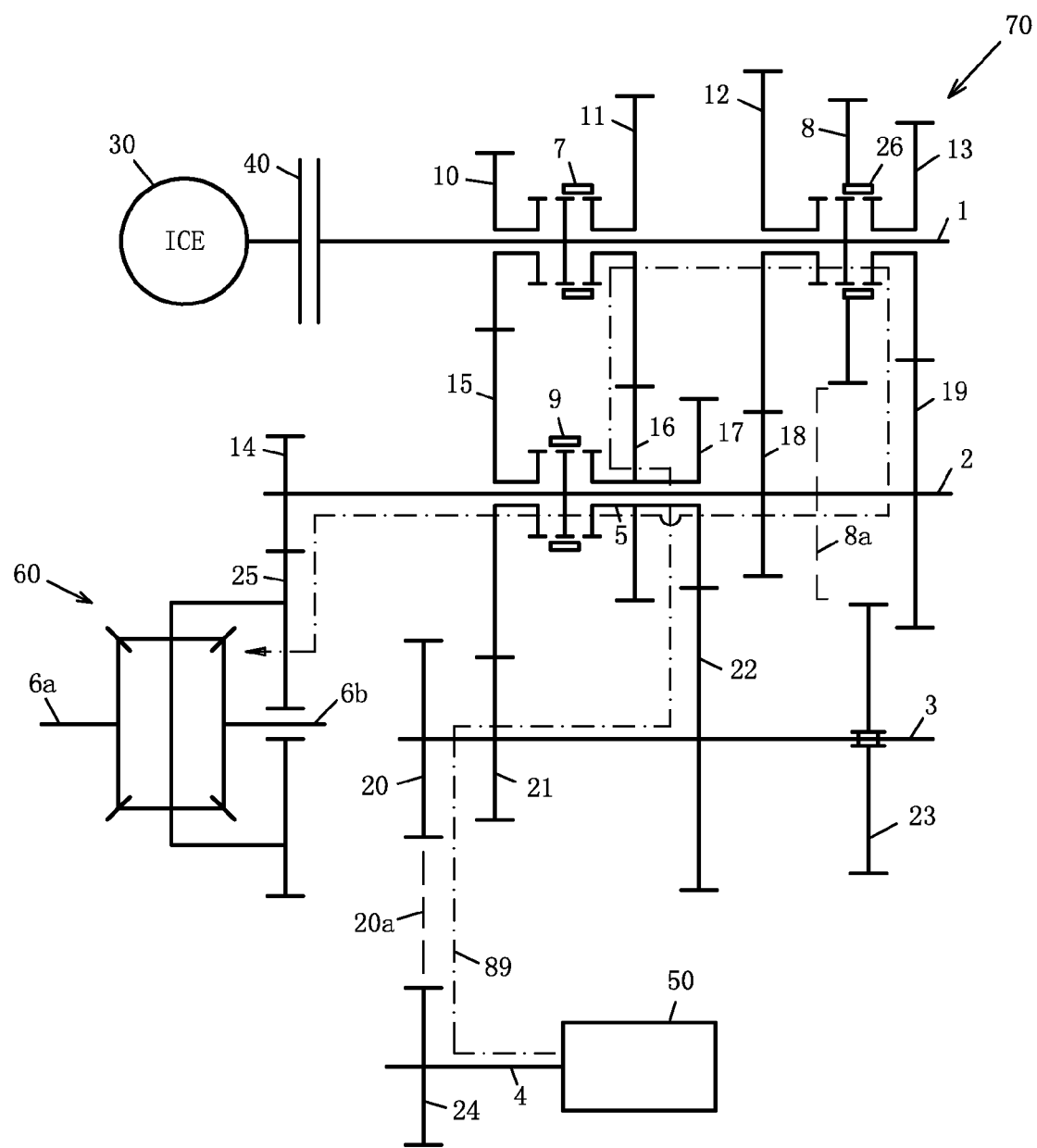

FIG. 12 shows a power transmitting path 89 that the HPDS 110 and the transmission 70 can provide for a third forward speed ratio while operating in the PMDM. The power transmitting path 89 can be achieved when (i) the synchronizer 7 is engaged to the driving gearwheel 11, (ii) the synchronizer 26 is engaged to the driving gearwheel 13, and (iii) the synchronizer 9 is in its neutral position. Furthermore, the clutch 40 can be disengaged such that the ICE 30 is not coupled to the input shaft 1 or the ICE 30 is not outputting power. Shifting the transmission 70 into this third forward speed ratio can include at least one of the following: forcing the synchronizer 7 to move axially to engage to the driving gearwheel 11, forcing the synchronizer 26 to move axially to engage to the driving gearwheel 13, and forcing the synchronizer 9 to move axially into its neutral position.

For the third forward speed ratio in the PMDM, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 and the driven gearwheel 16 on the intermediate shaft 5, the driving gearwheel 11 on the input shaft 1, the driving gearwheel 13 on the input shaft 1, the driven gearwheel 19 on the output shaft 2, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

4. Fourth Forward Speed Ratio (PMDM)

Figure 13:
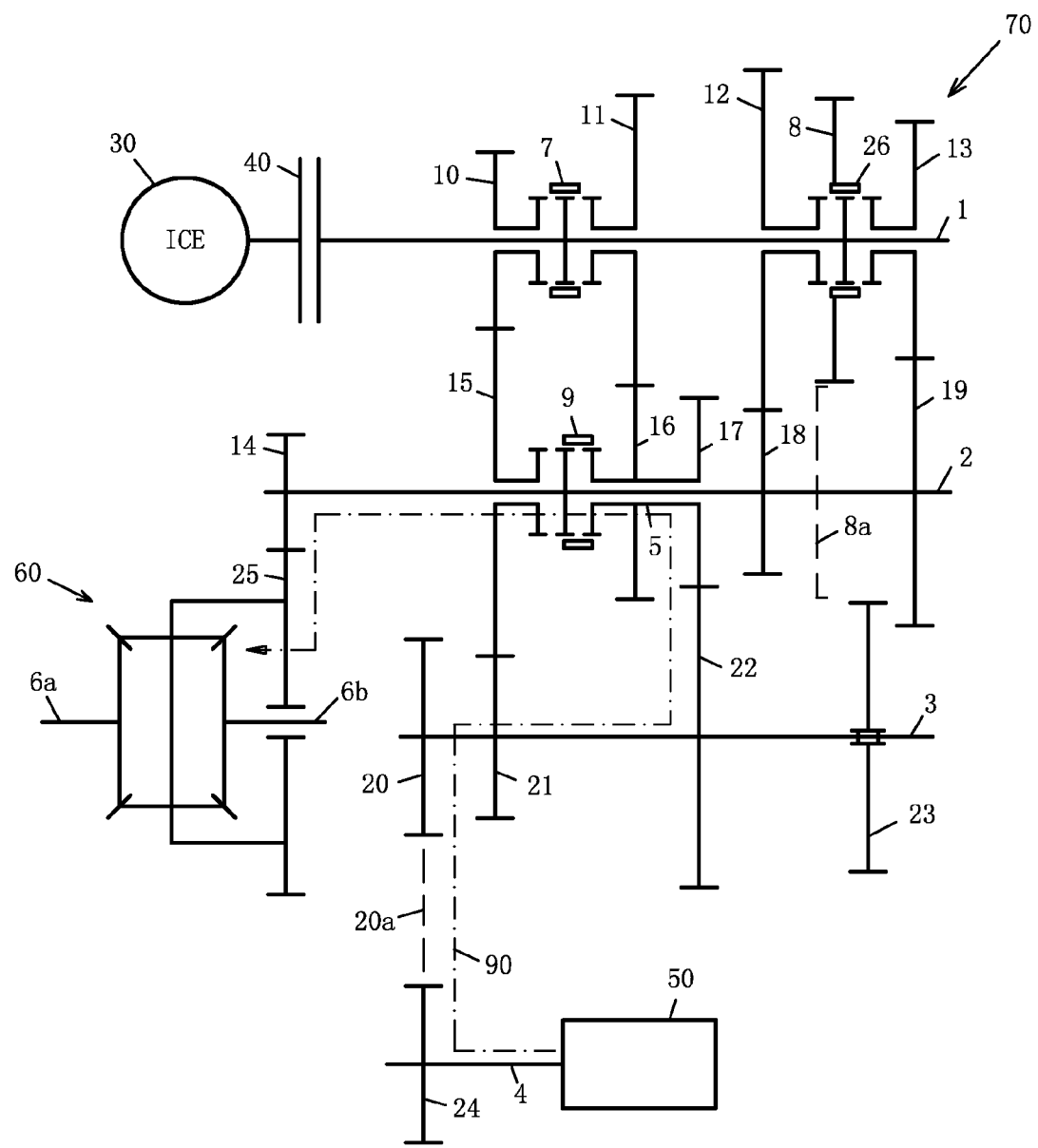

FIG. 13 shows a power transmitting path 90 that the HPDS 110 and the transmission 70 can provide for a fourth forward speed ratio while operating in the PMDM. The power transmitting path 90 can be achieved when (i) the synchronizer 7 and the synchronizer 26 are in their neutral position, and (ii) the synchronizer 9 is engaged to the driven gearwheel 16. Furthermore, the clutch 40 can be disengaged such that the ICE 30 is not coupled to the input shaft 1 or the ICE 30 is not outputting power. Shifting the transmission 70 into this fourth forward speed ratio can include at least one of the following: forcing the synchronizer 7 to move axially into its neutral position, forcing the synchronizer 26 to move axially into its neutral position, and forcing the synchronizer 9 to engage to the driven gearwheel 16.

For the fourth forward speed ratio in the PMDM, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 can be output by at least one of the half-axles 6a and 6b and to a respective wheel connectable thereto.

C. Power Transmitting Paths—Hybrid Driving Mode (HDM)

1. First Forward Speed Ratio (HDM)

Figure 14:
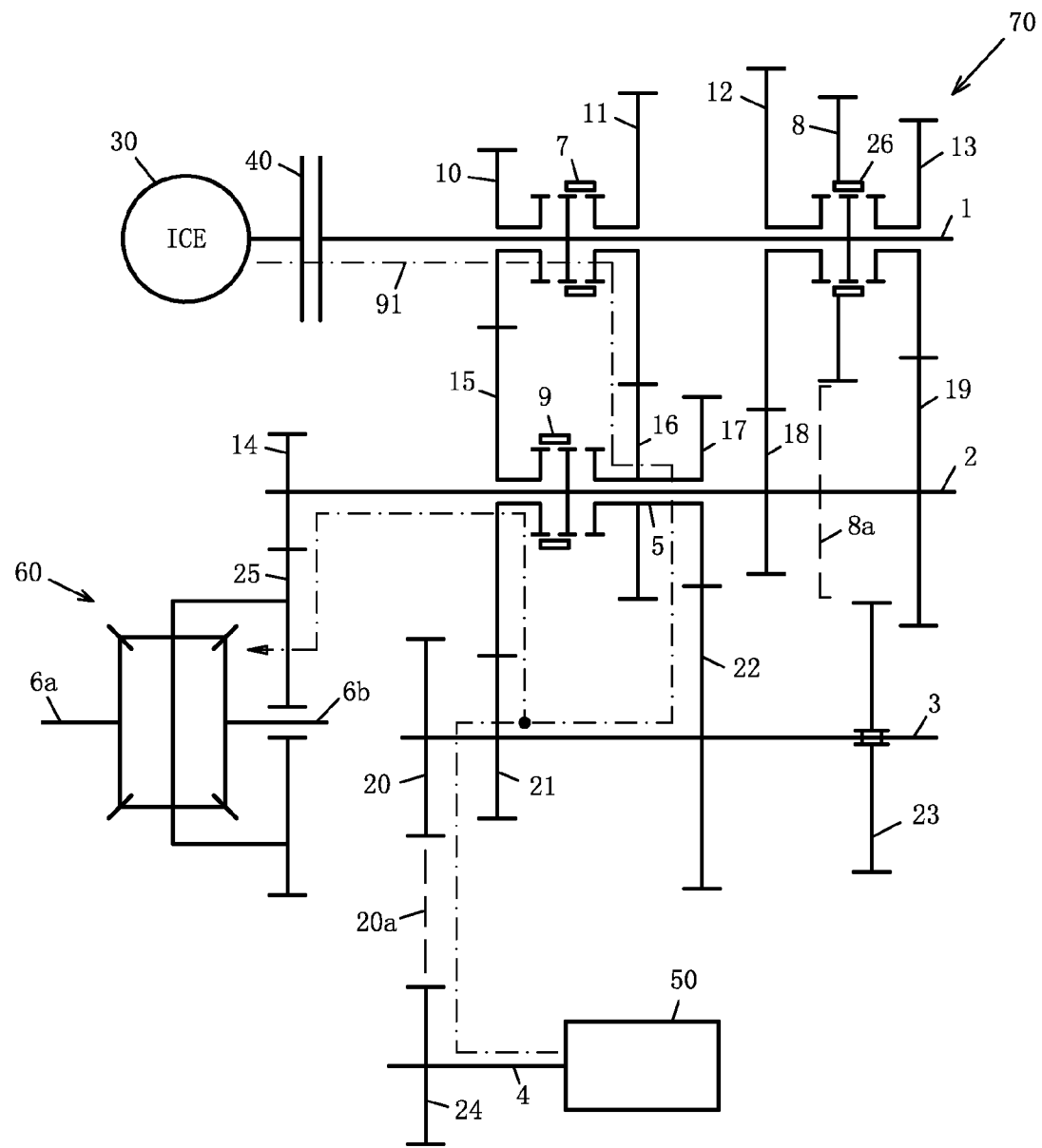

FIG. 14 shows a power transmitting path 91 that the HPDS 110 and the transmission 70 can provide for a first forward speed ratio while operating in the HDM. The power transmitting path 91 can be achieved when (i) the clutch 40 is in an engaged state such that ICE 30 is coupled to the input shaft 1, (ii) the synchronizer 7 is engaged to the driving gearwheel 11, (iii) the synchronizer 26 is in its neutral position, and (iv) the synchronizer 9 is engaged to the driven gearwheel 15. Shifting the transmission 70 into this first forward speed ratio can include at least one of the following: forcing the synchronizer 7 to move axially to engage to the driving gearwheel 11, forcing the synchronizer 26 to move axially into its neutral position, and forcing the synchronizer 9 to engage to the driven gearwheel 15.

For the first forward speed ratio in the HDM, the power output by the ICE 30 is transmitted in sequence through the driving gearwheel 11 on the input shaft 1, the driven gearwheel 16 on the output shaft 2, the driven gearwheel 17 on the intermediate shaft 5, the driven gearwheel 22 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the first forward speed ratio in the HDM, the power transmitting path for power from the ICE 30 follows the power transmitting path 80 and the power from the EM 50 follows the power transmitting path 87.

2. Second Forward Speed Ratio (HDM)

Figure 15:
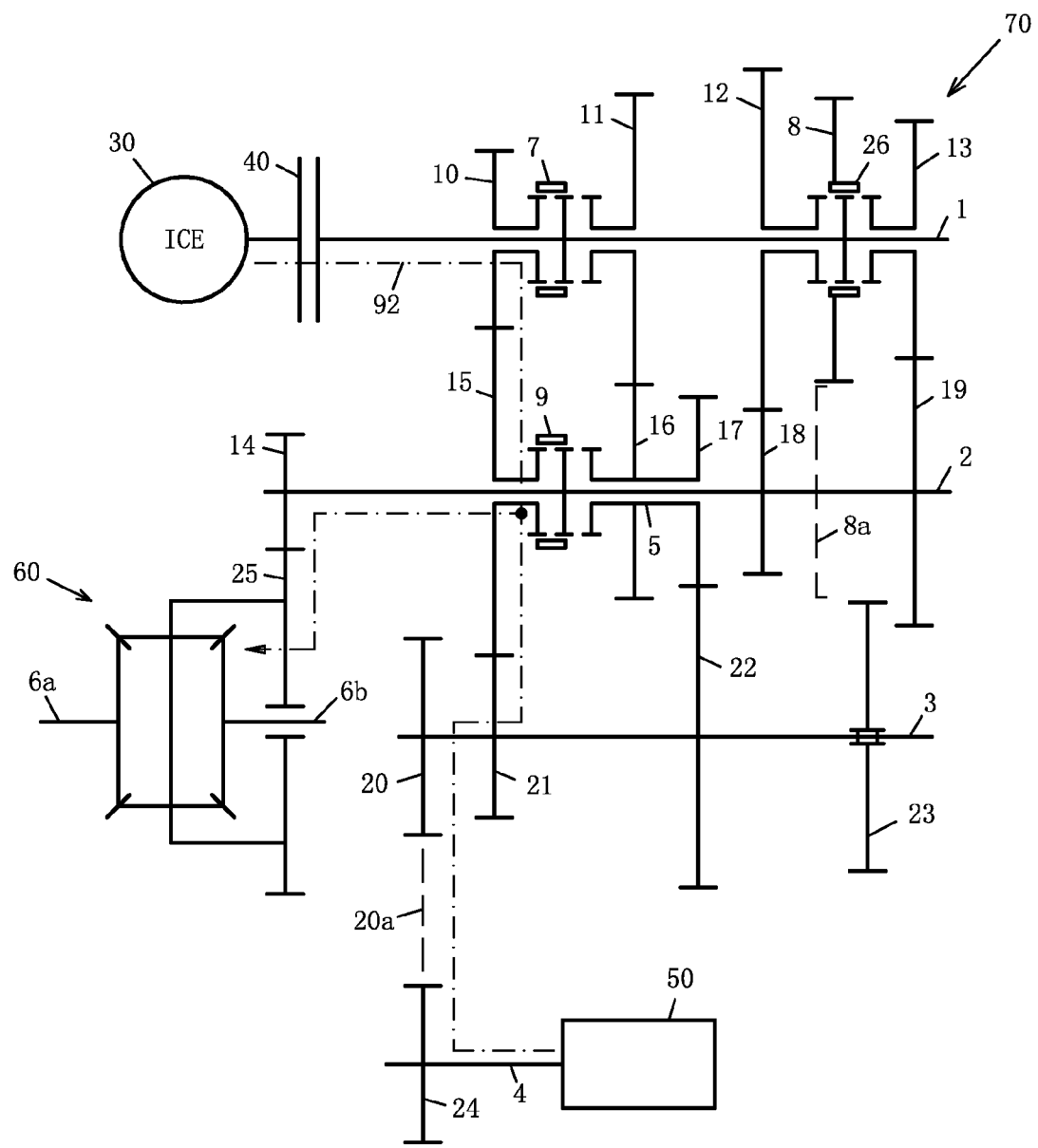

FIG. 15 shows a power transmitting path 91 that the HPDS 110 and the transmission 70 can provide for a second forward speed ratio while operating in the HDM. The power transmitting path 92 can be achieved when (i) the clutch 40 is in an engaged state such that ICE 30 is coupled to the input shaft 1, (ii) the synchronizer 7 is engaged to the driving gearwheel 10, (iii) the synchronizer 26 is in its neutral position, and (iv) the synchronizer 9 on the output shaft 2 is engaged to the driven gearwheel 15. Shifting the transmission 70 into this second forward speed ratio can include at least one of the following: forcing the synchronizer 7 to move axially to engage to the driving gearwheel 10, forcing the synchronizer 26 to move axially into its neutral position, and forcing the synchronizer 9 to move axially to engage to the driven gearwheel 15.

For the second forward speed ratio in the HDM, the power output by the ICE 30 is transmitted in sequence through the driving gearwheel 10 on the input shaft 1, the driven gearwheel 15 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the second forward speed ratio in the HDM, the power transmitting path for power from the ICE 30 follows the power transmitting path 81 and the power from the EM 50 follows the power transmitting path 87.

3. First Instance of Third Forward Speed Ratio (HDM)

Figure 16:
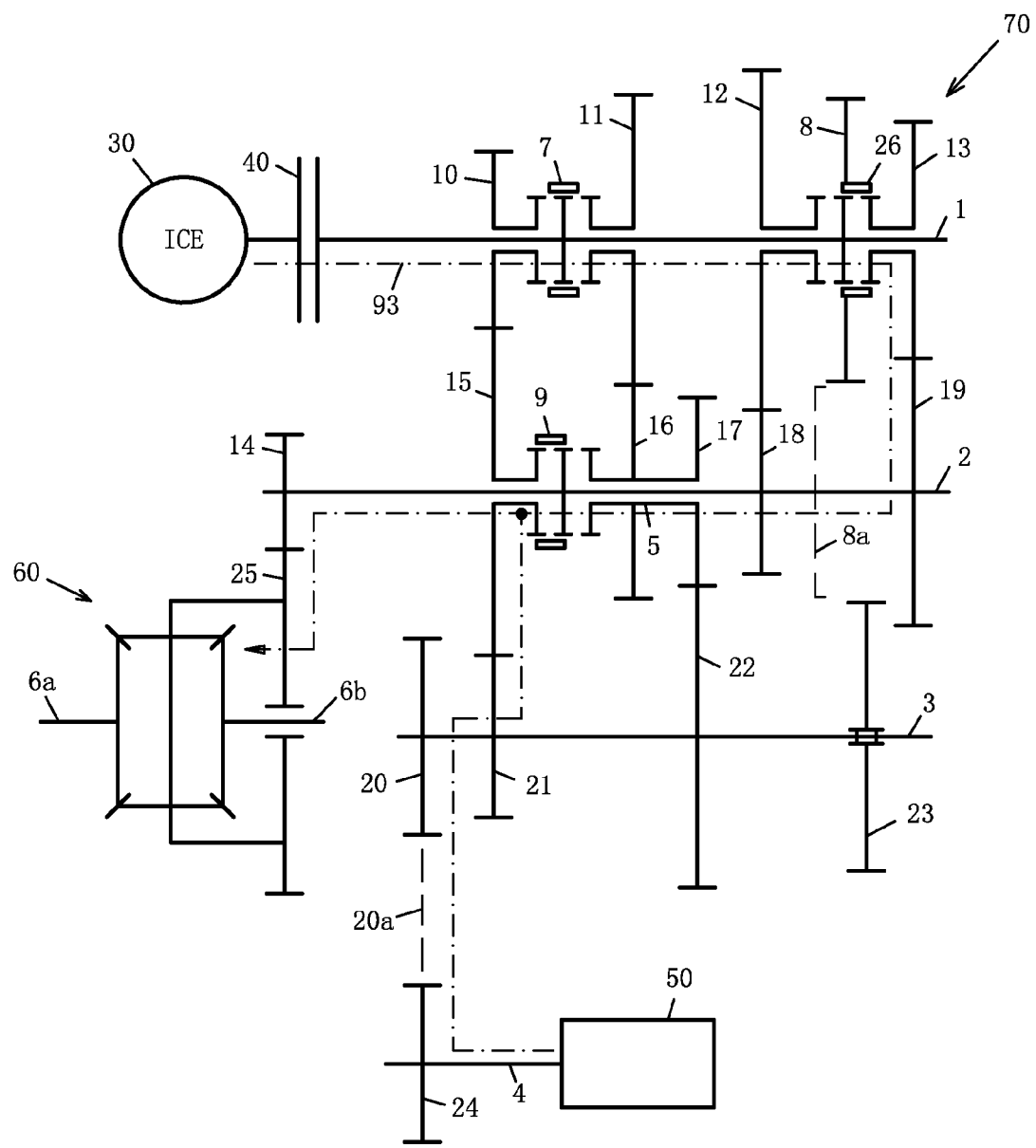

FIG. 16 shows a power transmitting path 93 that the HPDS 110 and the transmission 70 can provide for a first instance of a third forward speed ratio while operating in the HDM. The power transmitting path 93 can be achieved when (i) the clutch 40 is in an engaged state such that ICE 30 is coupled to the input shaft 1, (ii) the synchronizer 7 is in its neutral position, (iii) the synchronizer 26 is engaged to the driving gearwheel 13, and (iv) the synchronizer 9 is engaged to the driven gearwheel 15. Shifting the transmission 70 into this third forward speed ratio can include at least one of the following: forcing the synchronizer 7 to move axially into its neutral position, forcing the synchronizer 26 to move axially to engage to the driving gearwheel 13, and forcing the synchronizer 9 to move axially to engage to the driven gearwheel 15.

For the first instance of the third forward speed ratio in the HDM, the power output by the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the first instance of the third forward speed ratio in the HDM, the power transmitting path for power from the ICE 30 follows the power transmitting path 82 and the power from the EM 50 follows the power transmitting path 87.

4. Second Instance of Third Forward Speed Ratio (HDM)

Figure 17:
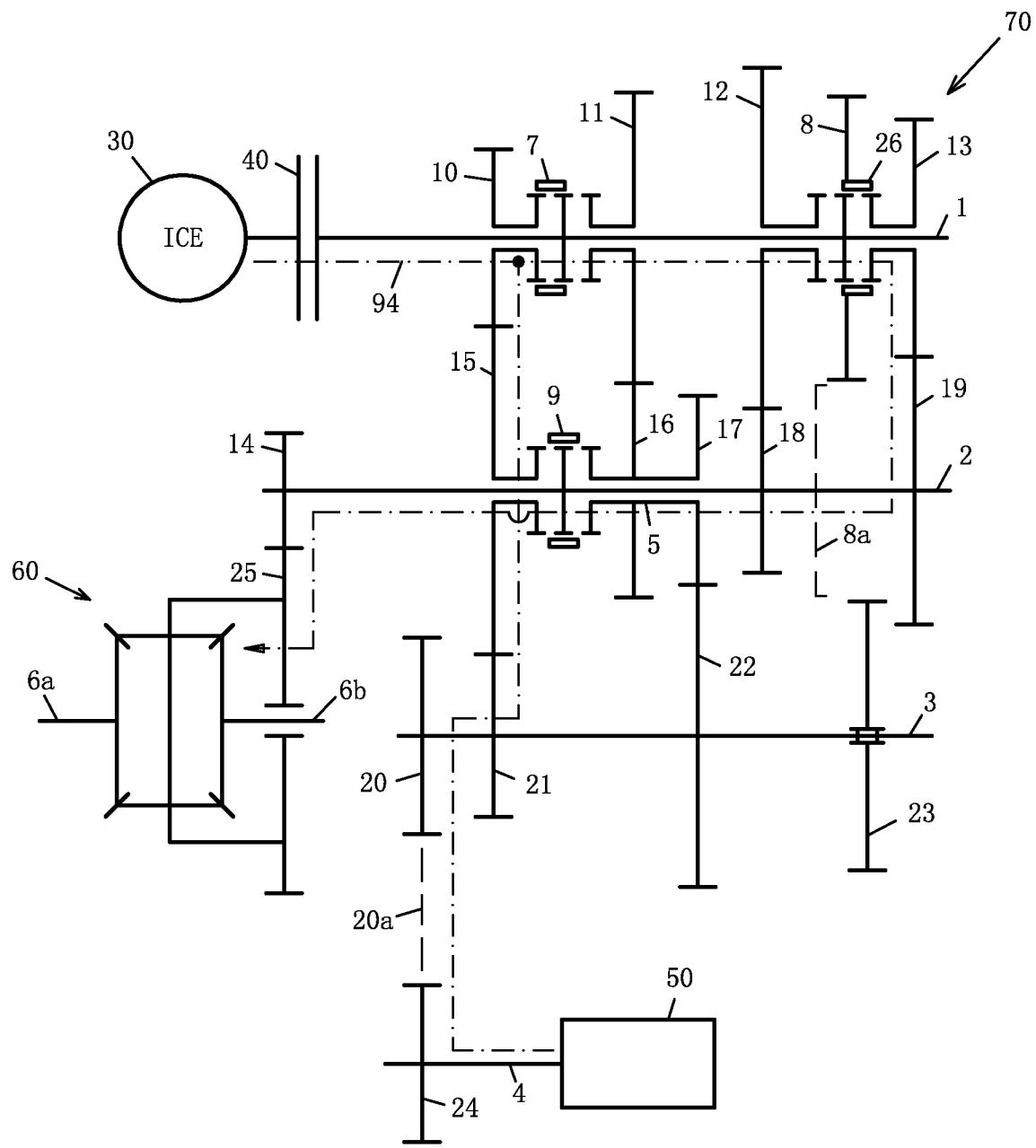

FIG. 17 shows a power transmitting path 94 that the HPDS 110 and the transmission 70 can provide for a second instance of a third forward speed ratio while operating in the HDM. The power transmitting path 94 can be achieved when (i) the clutch 40 is in an engaged state such that ICE 30 is coupled to the input shaft 1, (ii) the synchronizer 7 is engaged to the driving gearwheel 10, (iii) the synchronizer 26 is engaged to the driving gearwheel 13, and (iv) the synchronizer 9 is in its neutral position. Shifting the transmission 70 into this third forward speed ratio can include at least one of the following: forcing the synchronizer 7 to move axially to engage to the driving gearwheel 10, forcing the synchronizer 26 to move axially to engage to the driving gearwheel 13, and forcing the synchronizer 9 to move axially into its neutral position.

For the second instance of the third forward speed ratio in the HDM, the power output by the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the driving gearwheel 10 on the input shaft 1, the driving gearwheel 13 on the input shaft 1, the driven gearwheel 19 on the output shaft 2, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the second instance of the third forward speed ratio in the HDM, the power transmitting path for power from the ICE 30 follows the power transmitting path 82 and the power from the EM 50 follows the power transmitting path 88.

5. Third Instance of Third Forward Speed Ratio (HDM)

Figure 18:
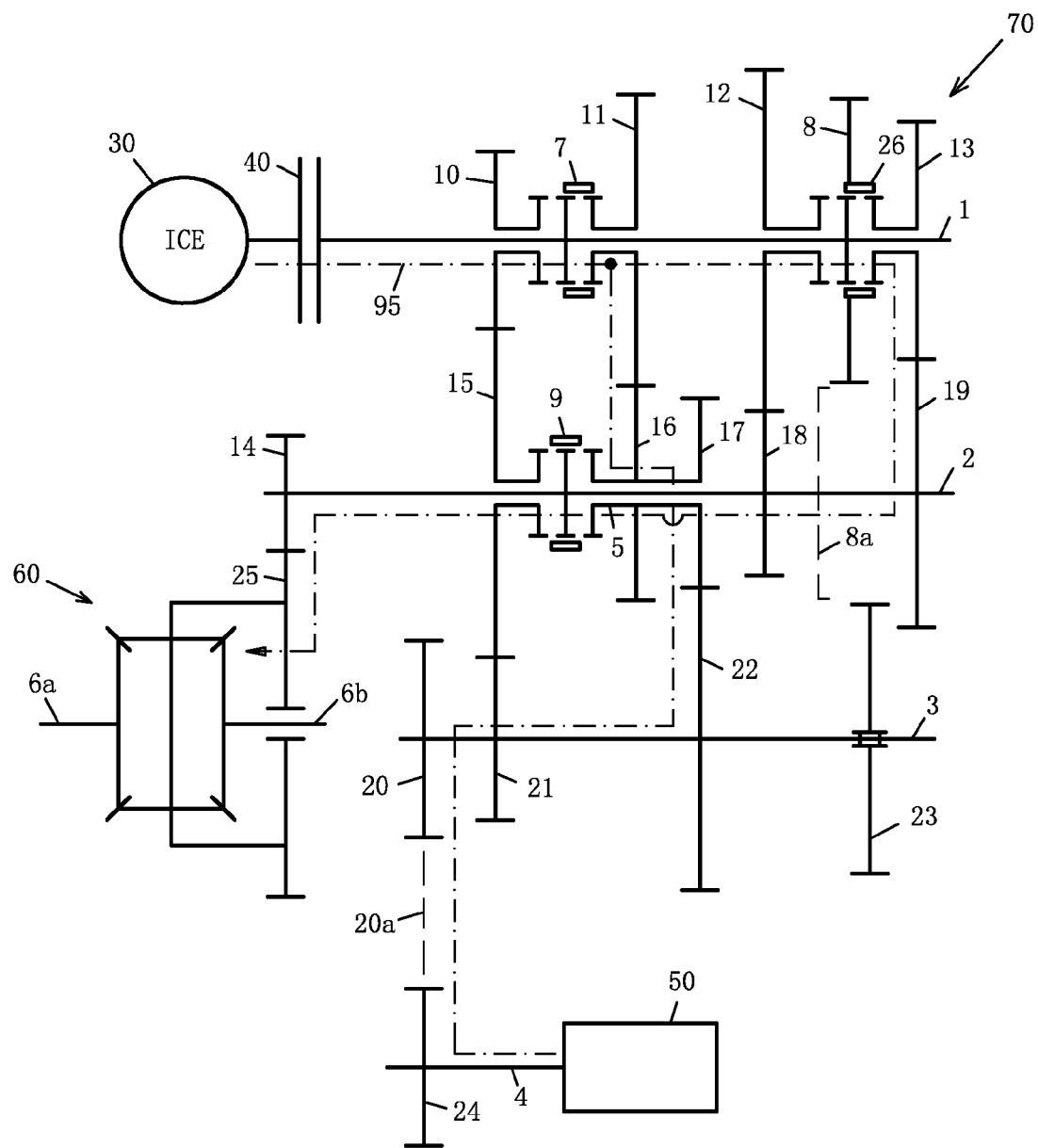

FIG. 18 shows a power transmitting path 95 that the HPDS 110 and the transmission 70 can provide for a third instance of a third forward speed ratio while operating in the HDM. The power transmitting path 95 can be achieved when (i) the clutch 40 is in an engaged state such that ICE 30 is coupled to the input shaft 1, (ii) the synchronizer 7 is engaged to the driving gearwheel 11, (iii) the synchronizer 26 is engaged to the driving gearwheel 13, and (iv) the synchronizer 9 is in its engaged position. Shifting the transmission 70 into this third forward speed ratio can include at least one of the following: forcing the synchronizer 7 to move axially to engage to the driving gearwheel 11, forcing the synchronizer 26 to move axially to engage to the driving gearwheel 13, and forcing the synchronizer 9 to move axially into its neutral position.

For the third instance of the third forward speed ratio in the HDM, the power output by the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 and the driven gearwheel 16 on the intermediate shaft 5, the driving gearwheel 11 on the input shaft 1, the driving gearwheel 13 on the input shaft 1, the driven gearwheel 19 on the output shaft 2, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the third instance of the third forward speed ratio in the HDM, the power transmitting path for power from the ICE 30 follows the power transmitting path 82 and the power from the EM 50 follows the power transmitting path 89.

6. Fourth Instance of Third Forward Speed Ratio (HDM)

Figure 19:
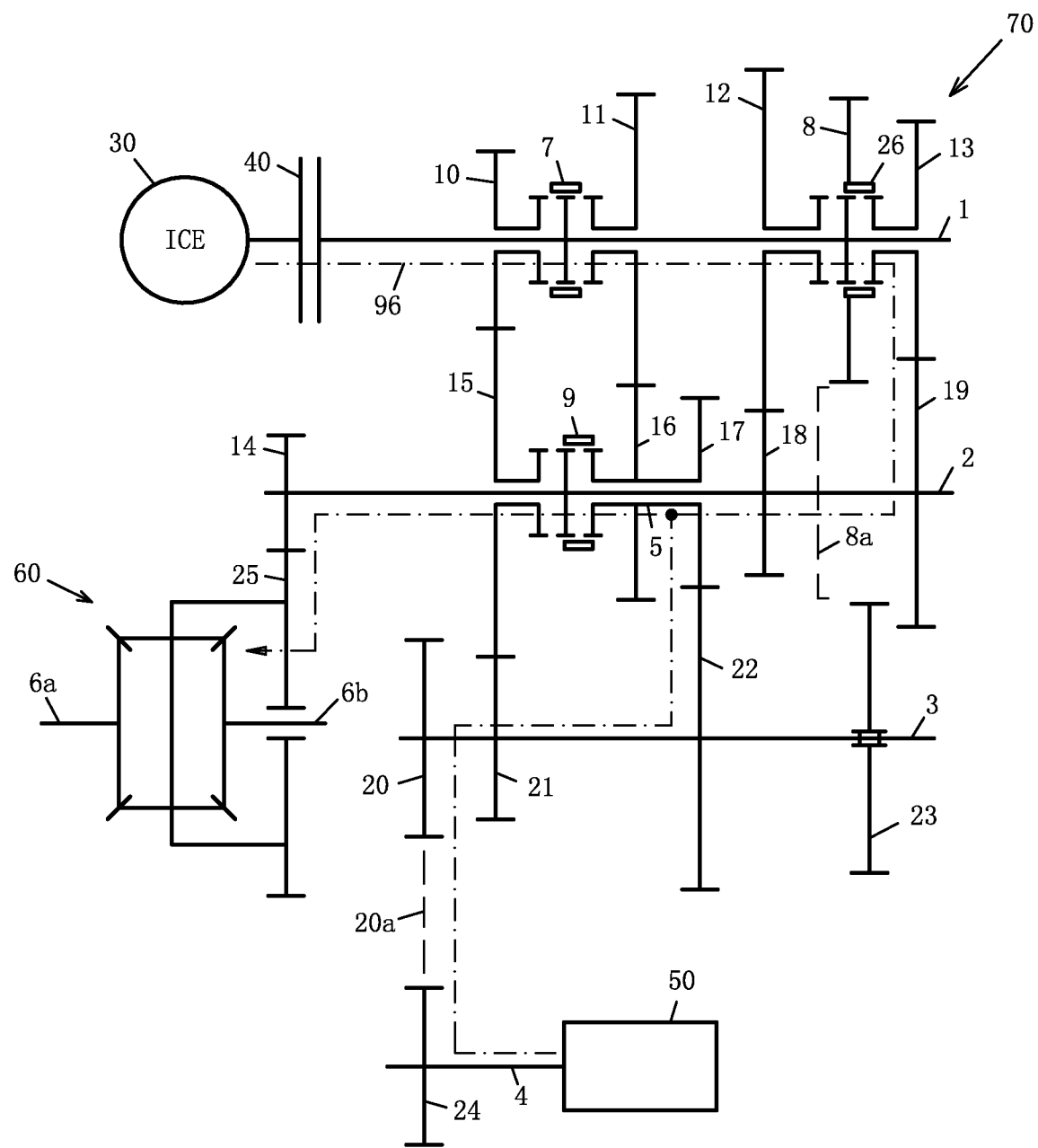

FIG. 19 shows a power transmitting path 96 that the HPDS 110 and the transmission 70 can provide for a fourth instance of a third forward speed ratio while operating in the HDM. The power transmitting path 96 can be achieved when (i) the clutch 40 is in an engaged state such that ICE 30 is coupled to the input shaft 1, (ii) the synchronizer 7 is in its neutral position, (iii) the synchronizer 26 is engaged to the driving gearwheel 13, and (iv) the synchronizer 9 is engaged to the driven gearwheel 16. Shifting the transmission 70 into this third forward speed ratio can include at least one of the following: forcing the synchronizer 7 to move axially into its neutral position, forcing the synchronizer 26 to move axially to engage to the driving gearwheel 13, and forcing the synchronizer 9 to move axially to engage to the driven gearwheel 16.

For the fourth instance of the third forward speed ratio in the HDM, the power output by the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the fourth instance of the third forward speed ratio in the HDM, the power transmitting path for power from the ICE 30 follows the power transmitting path 82 and the power from the EM 50 follows the power transmitting path 90.

7. Fourth Forward Speed Ratio (HDM)

Figure 20:
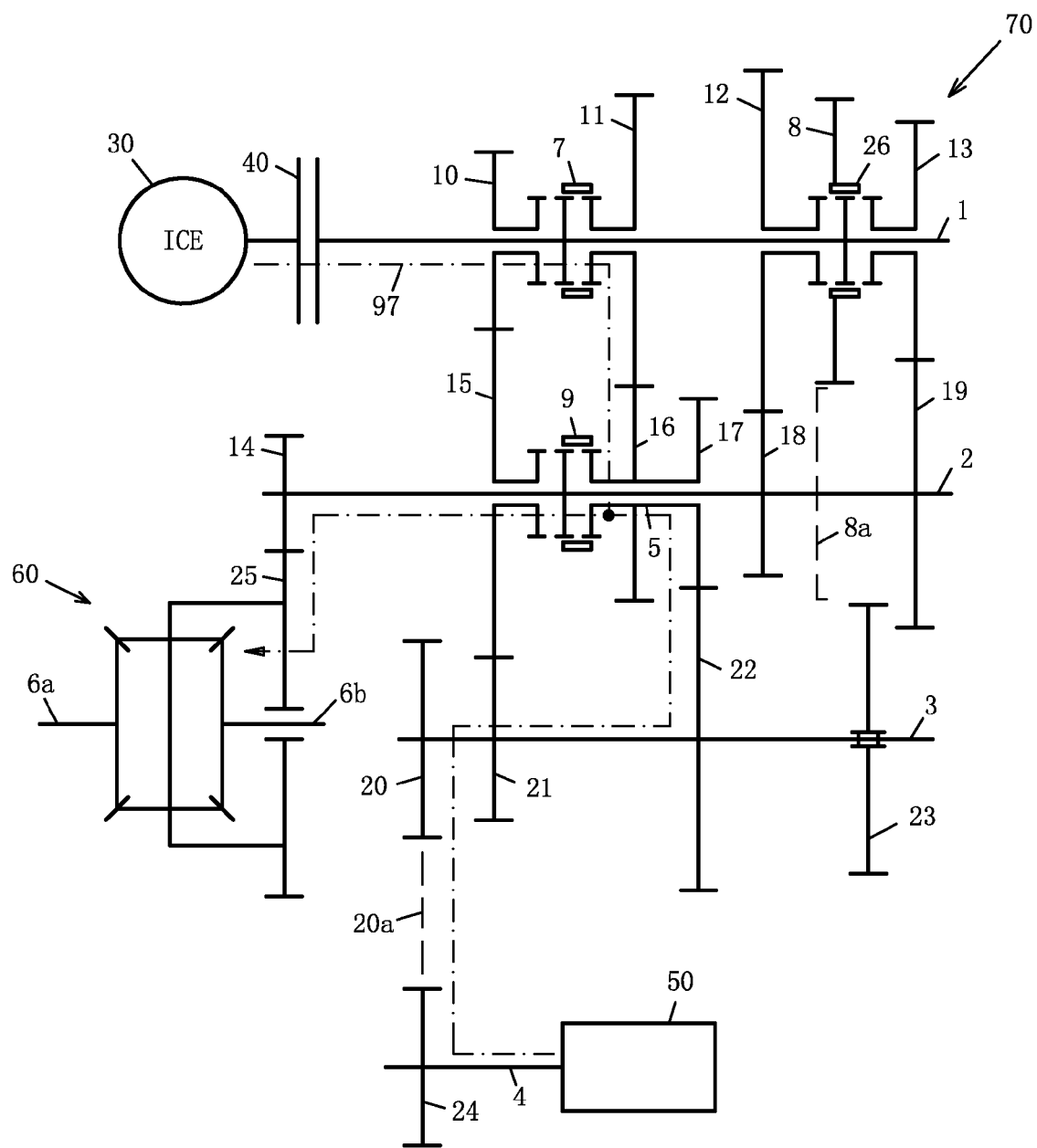

FIG. 20 shows a power transmitting path 97 that the HPDS 110 and the transmission 70 can provide for a fourth forward speed ratio while operating in the HDM. The power transmitting path 97 can be achieved when (i) the clutch 40 is in an engaged state such that ICE 30 is coupled to the input shaft 1, (ii) the synchronizer 7 is engaged to the driving gearwheel 11, (iii) the synchronizer 26 is in its neutral position, and (iv) the synchronizer 9 is engaged to the driven gearwheel 16. Shifting the transmission 70 into this fourth forward speed ratio can include at least one of the following: forcing the synchronizer 7 to move axially to engage to the driving gearwheel 11, forcing the synchronizer 26 to move axially into its neutral position, and forcing the synchronizer 9 to move axially to engage to the driven gearwheel 16.

For the fourth forward speed ratio in the HDM, the power output by the ICE 30 is transmitted in sequence through the driving gearwheel 11 on the input shaft 1, the driven gearwheel 16 on the intermediate shaft 5, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the fourth forward speed ratio in the HDM, the power transmitting path for power from the ICE 30 follows the power transmitting path 83 and the power from the EM 50 follows the power transmitting path 90.

8. Fifth Forward Speed Ratio (HDM)

Figure 21:
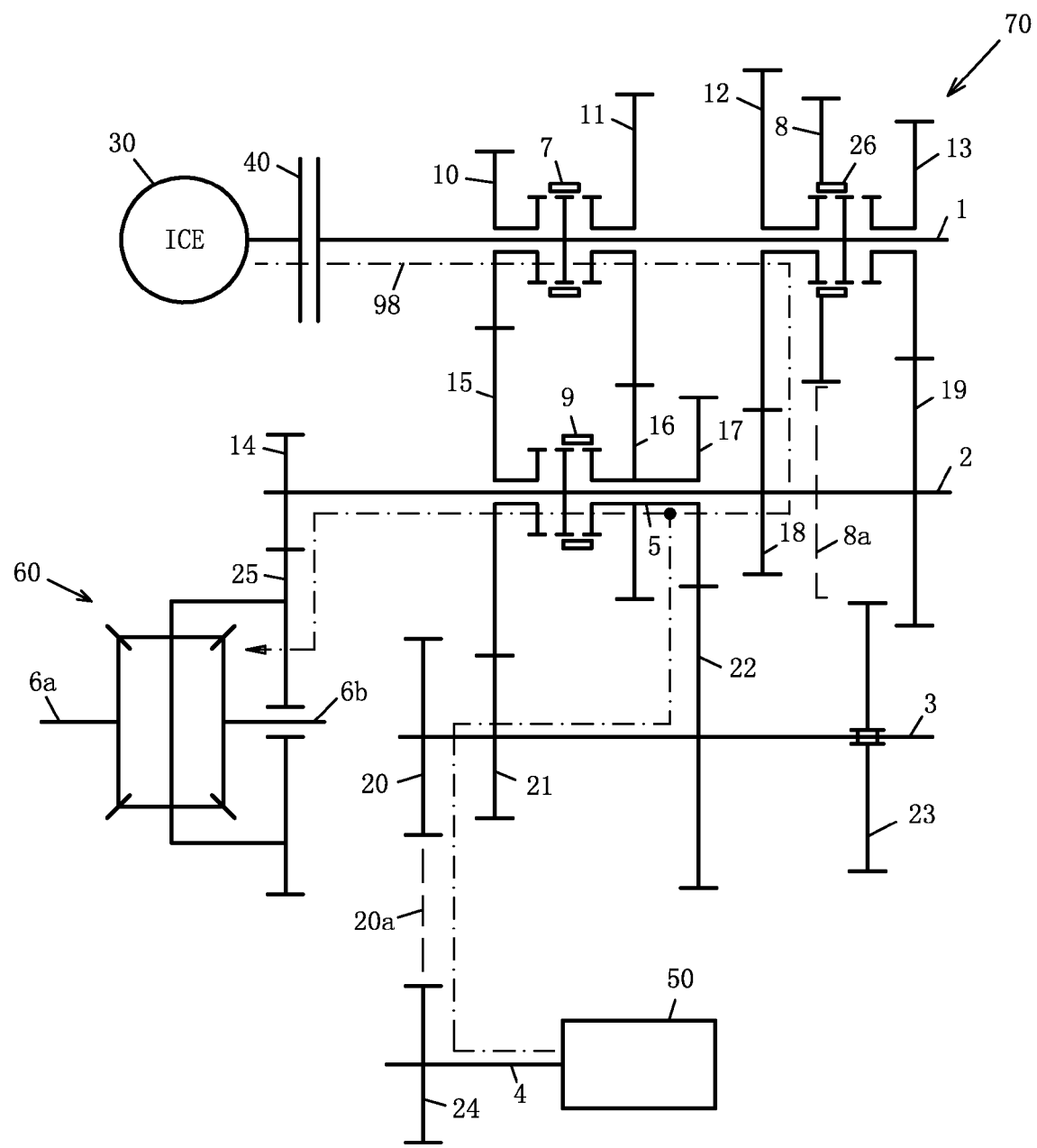

FIG. 21 shows a power transmitting path 98 that the HPDS 110 and the transmission 70 can provide for a firth forward speed ratio while operating in the HDM. The power transmitting path 98 can be achieved when (i) the clutch 40 is in an engaged state such that ICE 30 is coupled to the input shaft 1, (ii) the synchronizer 7 is in its neutral position, (iii) the synchronizer 26 is engaged to the driving gearwheel 12, and (iv) the synchronizer 9 is engaged to the driven gearwheel 16. Shifting the transmission 70 into this fifth forward speed ratio can include at least one of the following: forcing the synchronizer 7 to move axially into its neutral position, forcing the synchronizer 26 to move axially to engage to the driving gearwheel 12, and forcing the synchronizer 9 to move axially to engage to the driven gearwheel 16.

For the fifth forward speed ratio in the HDM, the power output by the ICE 30 is transmitted in sequence through the driving gearwheel 12 on the input shaft 1, the driven gearwheel 18 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the fifth forward speed ratio in the HDM, the power transmitting path for power from the ICE 30 follows the power transmitting path 84 and the power from the EM 50 follows the power transmitting path 90.

9. Sixth Forward Speed Ratio (HDM)

Figure 22:
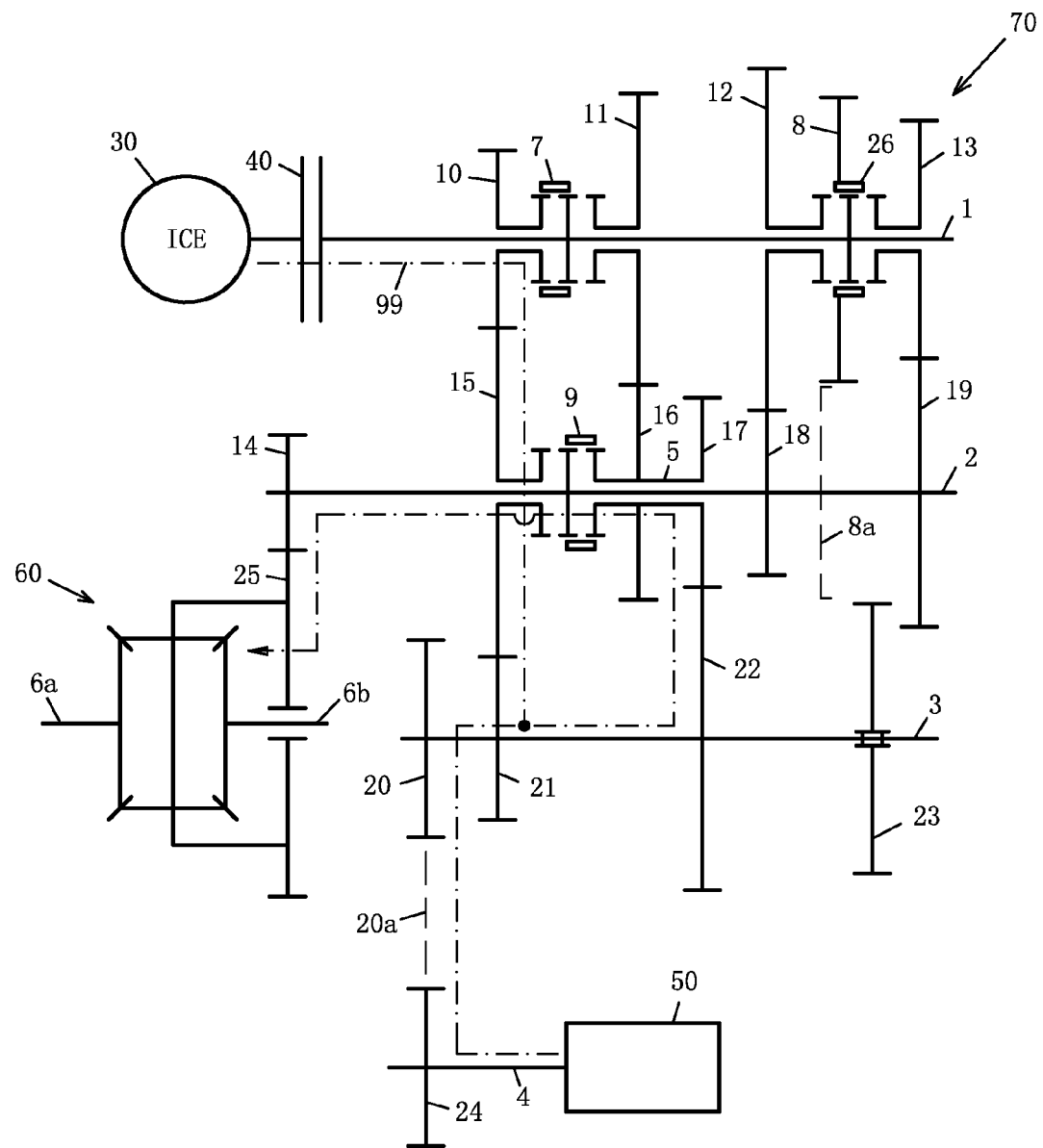

FIG. 22 shows a power transmitting path 99 that the HPDS 110 and the transmission 70 can provide for a sixth forward speed ratio while operating in the HDM. The power transmitting path 99 can be achieved when (i) the clutch 40 is in an engaged state such that ICE 30 is coupled to the input shaft 1, (ii) the synchronizer 7 is engaged to the driving gearwheel 10, (iii) the synchronizer 26 is in its neutral position, and (iv) the synchronizer 9 is engaged to the driven gearwheel 16. Shifting the transmission 70 into this sixth forward speed ratio can include at least one of the following: forcing the synchronizer 7 to move axially to engage to the driving gearwheel 10, forcing the synchronizer 26 to move axially into its neutral position, and forcing the synchronizer 9 to move axially to engage to the driven gearwheel 16.

For the sixth forward speed ratio in the HDM, the power output by the ICE 30 is transmitted in sequence through the driving gearwheel 10 on the input shaft 1, the driven gearwheel 15 on the output shaft 2, the driven gearwheel 21 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the sixth forward speed ratio in the HDM, the power transmitting path for power from the ICE 30 follows the power transmitting path 85 and the power from the EM 50 follows the power transmitting path 90.

10. Reverse Speed Ratio (HDM)

Figure 23:
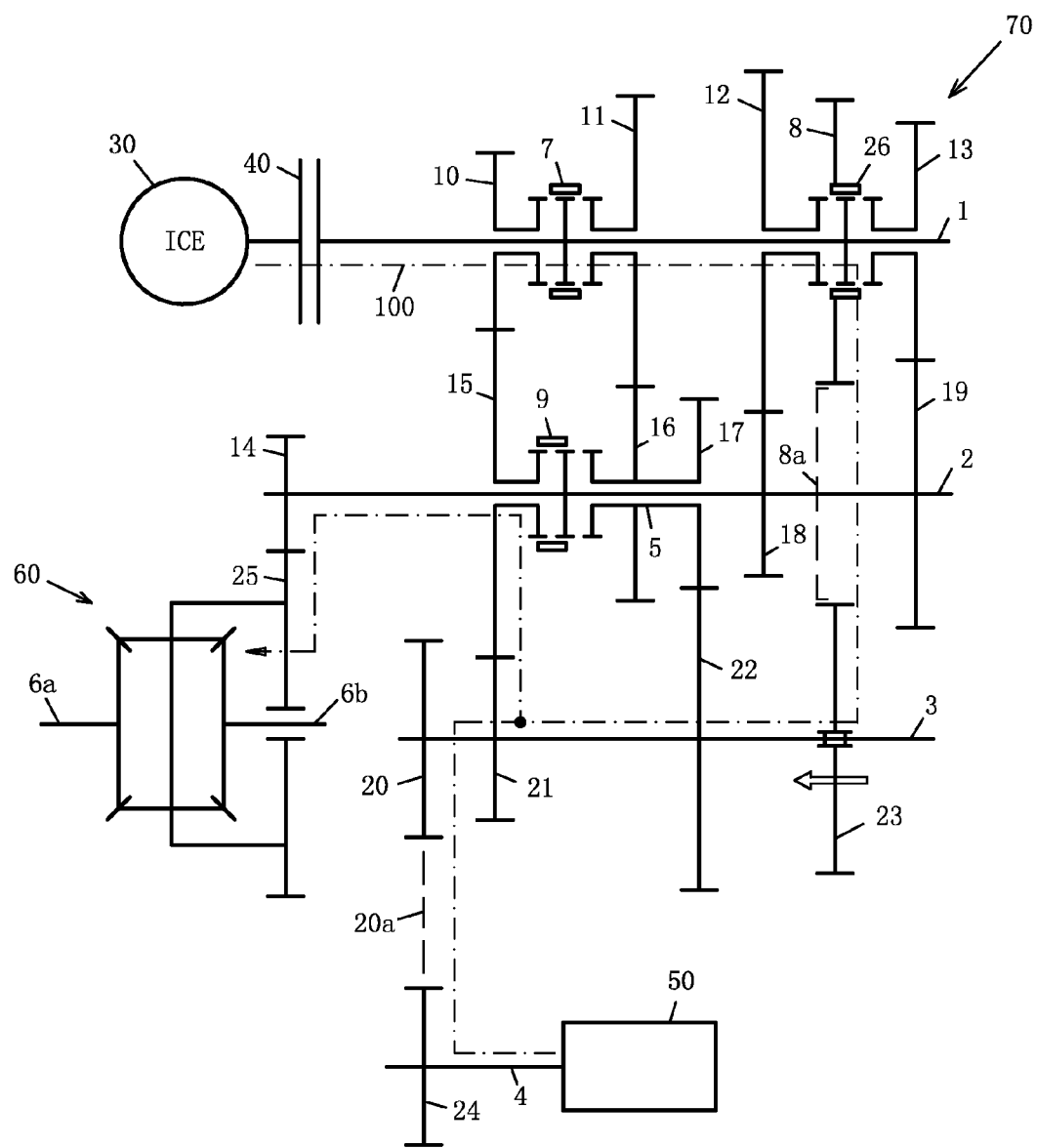

FIG. 23 shows a power transmitting path 100 that the HPDS 110 and the transmission 70 can provide for a reverse speed ratio while operating in the HDM. The power transmitting path 100 can be achieved when (i) the clutch 40 is in an engaged state such that ICE 30 is coupled to the input shaft 1, (ii) the synchronizer 7 and the synchronizer 26 is in their neutral position, (iii) the synchronizer 9 is engaged to the driven gearwheel 15, and (iv) the driven gearwheel 23 is engaged to the driving gearwheel 8. Shifting the transmission 70 for this reverse speed ratio can include at least one of the following: forcing the synchronizer 7 to move axially into its neutral position, forcing the synchronizer 26 to move axially into its neutral position, forcing the synchronizer 9 to move axially to engage to the driven gearwheel 15, and forcing the driven gearwheel 23 to move axially to engage to the driving gearwheel 8.

For the reverse speed ratio in the HDM, the power output by the ICE 30 is transmitted in sequence through the driving gearwheel 8 on the synchronizer 26, the driven gearwheel 23 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Additionally, the power output by the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 from the ICE 30 and the EM 50 can be output by at least one of the half-axles 6a and 6b and to a respective wheel connectable thereto.

Stated another way, for the reverse speed ratio in the HDM, the power transmitting path for power from the ICE 30 follows the power transmitting path 86 and the power from the EM 50 follows the power transmitting path 87 with the EM 50 turning in a direction opposite the direction the EM turns for the first forward speed ration in the PMDM.

IV. HPDS Shifting for without Power Interruption

The HPDS 110 and the transmission 70 can provide for gear shifting without power interruption for the HDM. Table 3 includes data showing an example sequence of shifting that can occur without power interruption. The power transmitting path identifiers 91-99 are shown in the first column with ICE# and EM#, where # equals a forward speed ratio. Referring to the orientation of the synchronizers 7, 9, and 26 in FIG. 1, the synchronizers can be moved axially to the left or to the right. In Table 3, X represents the left, neutral, or right position of a synchronizer. In any two adjacent rows in Table 3, at least one synchronizer remains in the same left or right position. In that way, power being provided by the EM 50 can be output by the differential half-axles 6a and 6b while at least one of the other synchronizers is moved to perform shifting from the speed ratio provided by one power transmitting path to a speed ratio provided by an adjacent power transmitting path.

TABLE 3

| Power Trans. Path | Synchronizer 7 | | | Synchronizer 26 | | | Synchronizer 9 | | |
|---|---|---|---|---|---|---|---|---|---|
| | Left | Neutral | Right | Left | Neutral | Right | Left | Neutral | Right |
| 91 (ICE1-EM1) | | | X | X | | | X | | |
| 92 (ICE2-EM1) | X | | | X | | | X | | |
| 93 (ICE3-EM1) | | X | | | | X | X | | |
| 94 (ICE3-EM2) | X | | | | | X | | X | |
| 95 (ICE3-EM3) | | X | | | | X | | X | |
| 96 (ICE3-EM4) | | X | | | | X | | | X |
| 97 (ICE4-EM4) | | X | | X | | | | | X |
| 98 (ICE5-EM4) | | X | | X | | | | | X |
| 99 (ICE6-EM4) | X | | | | | X | | | X |

The shifting without power interruption can occur in a direction from power transmitting path 91 to power transmitting path 99 or in a direction from power transmitting path 99 to power transmitting path 91. Moreover, the shifting without power interruption can occur in any of those directions with as few as two of the adjacent power transmitting paths.

V. Additional Example Embodiments

The following examples set out further or alternative aspects of the disclosure. Any reference characters (e.g., numbers or letters) to items in the figures or to the figures are for ease of reference only and are not limiting on the scope of the other examples described herein.

Example 1

A hybrid-power driving system comprising:
an input shaft (1) carrying a first driving gearwheel (10), a second driving gearwheel (11), a third driving gearwheel (12), and a fourth driving gearwheel (13) disposed thereon;
a first synchronizer (7), disposed on the input shaft (1), for releasably synchronizing at least one of the first driving gearwheel (10) and the second driving gearwheel (11) to the input shaft (1), a second synchronizer (26), disposed on the input shaft (1), for releasably synchronizing at least one of the third driving gearwheel (12) and the fourth driving gearwheel (13) to the input shaft (1);
an output shaft (2) carrying a speed-reducing gearwheel (14), a first driven gearwheel (15), a second driven gearwheel (18), and a third driven gearwheel (19) disposed thereon;
a first intermediate shaft (5) carrying a fourth driven gearwheel (16) and a fifth driven gearwheel (17) disposed thereon, wherein the first intermediate shaft (5) includes a hollow portion and is coaxial to the output shaft (2);
a third synchronizer (9), disposed on the output shaft (2), for releasably synchronizing at least one of the first driven gearwheel (15) and both the fourth driven gearwheel (16) and the fifth driven gearwheel (17) to the output shaft (2);
a second intermediate shaft (3) carrying a sixth driven gearwheel (20), a seventh driven gearwheel (21), an eighth driven gearwheel (22), and a ninth driven gearwheel (23) disposed thereon;
a motor shaft (4) carrying a fifth driving gearwheel (24) disposed thereon; and
a final driven gearwheel (25).

Example 2

The hybrid-power driving system of EXAMPLE 1, further comprising:
a chain or belt that links the sixth driven gearwheel (20) to the fifth driving gearwheel (24).

Example 3

The hybrid-power driving system of EXAMPLE 1, further comprising:
a third intermediate shaft (27) carrying a tenth driven gearwheel (28) and an eleventh driven gearwheel (29), wherein the tenth driven gearwheel (28) meshes with the fifth driving gearwheel (24), and
wherein the eleventh driven gearwheel (29) meshes with the sixth driven gearwheel (20).

Example 4

The hybrid-power driving system in any of EXAMPLES 1-3, wherein the input shaft, the output shaft, the first intermediate shaft, the second intermediate shaft, and the motor shaft are parallel to each other.

Example 5

The hybrid-power driving system in any of EXAMPLES 1-4, further comprising: a gearbox including at least a portion of each of the following: the input shaft, the output shaft, the first intermediate shaft, the second intermediate shaft, and the motor shaft.

Example 6

The hybrid-power driving system in any of EXAMPLES 1-5, further comprising: an internal combustion engine (ICE) (30); and an electric motor (EM) (50).

Example 7

The hybrid-power driving system in any of EXAMPLES 1-6, further comprising:
a clutch (40) disposed between the ICE (30);
a differential (60) that meshes with the final driven gearwheel (25),
wherein the clutch (40) is configured to couple the input shaft (1) to the ICE (30), and
wherein the clutch (40) is disposed between the ICE (30) and a one of the first driving gearwheel, the second driving gearwheel, the third driving gearwheel, and the fourth driving gearwheel that is positioned on the input shaft (1) closest to the ICE (30).

Example 8

The hybrid-power driving system in any of EXAMPLES 1-7, further comprising:
an air conditioning compressor (45), wherein an element of the air conditioning compressor (45) is rotatable by the motor shaft (4).

Example 9

The hybrid-power driving system in any of EXAMPLES 1-8,
wherein the first synchronizer (7) is configured for releasably synchronizing the first driving gearwheel (11) and the second driving gearwheel (12) to the input shaft (1) one at a time, and
wherein the second synchronizer (26) is configured for releasably synchronizing the third driving gearwheel (12) and the fourth driving gearwheel (13) to the input shaft (1) one at a time.

Example 10

The hybrid-power driving system in any of EXAMPLES 1-9, further comprising:
a sixth driving gearwheel (8) carried by the input shaft (1), wherein the ninth driven gearwheel (23) is slidable to releasably mesh with the sixth driving gearwheel (8).

Example 11

The hybrid-power driving system of EXAMPLE 10, wherein the sixth driving gearwheel (8) is disposed on the second synchronizer (26).

Example 12

The hybrid-power driving system in any of EXAMPLES 1-11, wherein the third synchronizer (9) is configured for releasably synchronizing the first driven gearwheel (15) and the fourth driven gearwheel (16) to the output shaft (2) one at a time.

Example 13

The hybrid-power driving system in any of EXAMPLES 1-12,
wherein the first driven gearwheel (15) constantly meshes with the first driving gearwheel (10) and the seventh driven gearwheel (21),
wherein the second driving gearwheel (11) constantly meshes with the fourth driven gearwheel (16),
wherein the third driving gearwheel (12) constantly meshes with the second driven gearwheel (18),
wherein the fourth driving gearwheel (13) constantly meshes with the third driven gearwheel (19),
wherein the fifth driven gearwheel (17) constantly meshes with the eighth driven gearwheel (22), and
wherein the speed-reducing gearwheel (14) constantly meshes with the final driven gearwheel (25).

Example 14

The hybrid-power driving system in any of EXAMPLES 6-13,
wherein the hybrid-power driving system provides for transmission of power in a first forward speed ratio in a pure engine driving mode with (i) the second driving gearwheel (11) synchronized to the input shaft (1) by the first synchronizer (7), (ii) the first driven gearwheel (15) synchronized to the output shaft (2) by the third synchronizer (9), and (iii) the input shaft (1) coupled to the ICE (30), and
wherein power from the ICE (30) in the first forward speed ratio in the pure engine driving mode is transmitted in sequence through the second driving gearwheel (11) on the first input shaft (1), the fourth driven gearwheel (16) on the first intermediate shaft (5), the eighth driven gearwheel (22) on the second intermediate shaft (3), the seventh driven gearwheel (21) on the second intermediate shaft (3), the first driven gearwheel (15) on the output shaft (2), the speed-reducing gearwheel (14) on the output shaft (2), and the final driven gearwheel (25).

Example 15

The hybrid-power driving system in any of EXAMPLES 6-14,
wherein the hybrid-power driving system provides for transmission of power in a second forward speed ratio in a pure engine driving mode with (i) the first driving gearwheel (10) synchronized to the input shaft (1) by the first synchronizer (7), (ii) the first driven gearwheel (15) synchronized to the output shaft (2) by the third synchronizer (9), and (iii) the input shaft (1) coupled to the ICE (30), and
wherein power from the ICE (30) in the second forward speed ratio in the pure engine driving mode is transmitted in sequence through the first driving gearwheel (10) synchronized to the input shaft (1), the first driven gearwheel (15) synchronized to the output shaft (2), the speed-reducing gearwheel (14) on the output shaft (2), and the final driven gearwheel (25).

Example 16

The hybrid-power driving system in any of EXAMPLES 6-15,
wherein the hybrid-power driving system provides for transmission of power in a third forward speed ratio in a pure engine driving mode with (i) the fourth driving gearwheel (13) synchronized to the input shaft (1) by the second synchronizer (8), and (ii) the input shaft (1) coupled to the ICE (30), and
wherein power from the ICE (30) in the third forward speed ratio in the pure engine driving mode is transmitted in sequence through the fourth driving gearwheel (13) synchronized to the input shaft (1), the third driven gearwheel (19) disposed on the output shaft (2), the speed-reducing gearwheel (14) on the output shaft (2), and the final driven gearwheel (25).

Example 17

The hybrid-power driving system in any of EXAMPLES 6-16,
wherein the hybrid-power driving system provides for transmission of power in a fourth forward speed ratio in a pure engine driving mode with (i) the second driving gearwheel (11) synchronized to the input shaft (1) by the first synchronizer (7), (ii) the fourth driven gearwheel (16) synchronized to the first intermediate shaft (5) by the third synchronizer (9), and (iii) the input shaft (1) coupled to the ICE (30), and
wherein power from the ICE (30) in the fourth forward speed ratio in the pure engine driving mode is transmitted in sequence through the second driving gearwheel (11) synchronized to the input shaft (1), the fourth driven gearwheel (16) synchronized to the first intermediate shaft (5), the speed-reducing gearwheel (14) on the output shaft (2), and the final driven gearwheel (25).

Example 18

The hybrid-power driving system in any of EXAMPLES 6-17,
wherein the hybrid-power driving system provides for transmission of power in a fifth forward speed ratio in a pure engine driving mode with (i) the third driving gearwheel (12) synchronized to the input shaft (1) by the second synchronizer (8), and (ii) the input shaft (1) coupled to the ICE (30), and
wherein power from the ICE (30) in the fifth forward speed ratio in the pure engine driving mode is transmitted in sequence through the third driving gearwheel (12) synchronized to the input shaft (1), the second driven gearwheel (18) disposed on the output shaft (2), the speed-reducing gearwheel (14) on the output shaft (2), and the final driven gearwheel (25).

Example 19

The hybrid-power driving system in any of EXAMPLES 6-18,
wherein the hybrid-power driving system provides for transmission of power in a sixth forward speed ratio in a pure engine driving mode with (i) the first driving gearwheel (10) synchronized to the input shaft (1) by the first synchronizer (7), (ii) the fourth driven gearwheel (16) synchronized to the first intermediate shaft (5) by the third synchronizer (9), and (iii) the input shaft (1) coupled to the ICE (30), and wherein power from the ICE (30) in the sixth forward speed ratio in the pure engine driving mode is transmitted in sequence through the first driving gearwheel (10) synchronized to the input shaft (1), the first driven gearwheel (15) disposed on the output shaft (2), the seventh driven gearwheel (21) disposed on the second intermediate shaft (3), the eighth driven gearwheel (22) disposed on the second intermediate shaft (3), fifth driven gearwheel (17) disposed on the first intermediate shaft (5), the speed-reducing gearwheel (14) on the output shaft (2), and the final driven gearwheel (25).

Example 20

The hybrid-power driving system in any of EXAMPLES 6-19,
wherein the hybrid-power driving system provides for transmission of power for a reverse speed ratio in a pure engine driving mode with (i) the first driven gearwheel (15) synchronized to the output shaft (2) by the third synchronizer (9), (ii) the ninth driven gearwheel (23) meshed with the sixth driving gearwheel (8), and (iii) the input shaft (1) coupled to the ICE (30), and
wherein power from the ICE (30) for the a reverse speed ratio in the pure engine driving mode is transmitted in sequence through the sixth driving gearwheel (8), the ninth driven gearwheel (23) disposed on the second intermediate shaft (3), the seventh driven gearwheel (21) disposed on the second intermediate shaft (3), the first driven gearwheel (15) synchronized to the output shaft (2), the speed-reducing gearwheel (14) on the output shaft (2), and the final driven gearwheel (25).

Example 21

The hybrid-power driving system in any of EXAMPLES 6-20,
wherein the hybrid-power driving system provides for transmission of power in a first forward speed ratio in a pure motor driving mode with the first driven gearwheel (15) synchronized to the output shaft (2) by the third synchronizer (9), and
wherein power from the EM 50 in the first forward speed ratio in the pure engine motor mode is transmitted in sequence through the fifth driving gearwheel (24) on the motor shaft (4), the sixth driven gearwheel (20) on the second intermediate shaft (3), the seventh driven gearwheel (21) on the second intermediate shaft (3), the first driven gearwheel (15) on the output shaft (2), the speed-reducing gearwheel (14) on the output shaft (2), and the final driven gearwheel (25).

Example 22

The hybrid-power driving system in any of EXAMPLES 6-21,
wherein the hybrid-power motor system provides for transmission of power in a second forward speed ratio in a pure motor driving mode with (i) the first driving gearwheel (10) synchronized to the input shaft (1) by the first synchronizer (7), (ii) the fourth driving gearwheel (13) synchronized to the input shaft (1) by the second synchronizer (8), and (iii) the input shaft (1) coupled to the ICE (30), and wherein power from the EM 50 in the second forward speed ratio in the pure motor driving mode is transmitted in sequence through the fifth driving gearwheel (24) on the motor shaft (4), the sixth driven gearwheel (20) on the second intermediate shaft (3), the seventh driven gearwheel (21) on the second intermediate shaft (3), the first driven gearwheel (15) on the output shaft (2), first driving gearwheel (10) on the input shaft (1), fourth driving gearwheel (13) on the input shaft (1), the third driven gearwheel (19) on the output shaft (2), the speed-reducing gearwheel (14) on the output shaft (2), and the final driven gearwheel (25).

Example 23

The hybrid-power driving system in any of EXAMPLES 6-22,
wherein the hybrid-power motor system provides for transmission of power in a third forward speed ratio in a pure motor driving mode with (i) the second driving gearwheel (11) synchronized to the input shaft (1) by the first synchronizer (7), and (ii) the fourth driving gearwheel (13) synchronized to the input shaft (1) by the second synchronizer (8), and
wherein power from the EM 50 in the third forward speed ratio in the pure motor driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on the first intermediate shaft (5), the fourth driven gearwheel (16) on the first intermediate shaft (5), the second driving gearwheel (11) on the input shaft (1), the fourth driving gearwheel (13) on the input shaft (1), the third driven gearwheel (19) on the output shaft (2), the speed-reducing gearwheel (14) on the output shaft (2), and the final driven gearwheel (25).

Example 24

The hybrid-power driving system in any of EXAMPLES 6-23,
wherein the hybrid-power motor system provides for transmission of power in a fourth forward speed ratio in a pure motor driving mode with the fourth driven gearwheel (16) synchronized to the output shaft (2) by the third synchronizer (9), and
wherein power from the EM 50 in the fourth forward speed ratio in the pure motor driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on the first intermediate shaft (5), the speed-reducing gearwheel (14) on the output shaft (2), and the final driven gearwheel (25).

Example 25

The hybrid-power driving system in any of EXAMPLES 6-24,
wherein the hybrid-power driving system provides for transmission of power in a first forward speed ratio in a hybrid driving mode with (i) the second driving gearwheel (11) synchronized to the input shaft (1) by the first synchronizer (7), (ii) the first driven gearwheel (15) synchronized to the output shaft (2) by the third synchronizer (9), and (iii) the input shaft (1) coupled to the ICE (30), wherein power from the ICE (30) in the first forward speed ratio in the hybrid driving mode is transmitted in sequence through the second driving gearwheel (11) on the first input shaft (1), the fourth driven gearwheel (16) on the first intermediate shaft (5), the fifth driven gearwheel (17) on the first intermediate shaft (5), the eighth driven gearwheel (22) on the second intermediate shaft (3), the seventh driven gearwheel (21) on the second intermediate shaft (3), the first driven gearwheel (15) on the output shaft (2), the speed-reducing gearwheel (14) on the output shaft (2), and the final driven gearwheel (25), and wherein power from the EM 50 in the first forward speed ratio in the hybrid driving mode is transmitted in sequence through the fifth driving gearwheel (24) on the motor shaft (4), the sixth driven gearwheel (20) on the second intermediate shaft (3), the seventh driven gearwheel (21) on the second intermediate shaft (3), the first driven gearwheel (15) on the output shaft (2), the speed-reducing gearwheel (14) on the output shaft (2), and the final driven gearwheel (25).

Example 26

The hybrid-power driving system in any of EXAMPLES 6-25, wherein the hybrid-power driving system provides for transmission of power in a second forward speed ratio in a hybrid driving mode with (i) the first driving gearwheel (10) synchronized to the input shaft (1) by the first synchronizer (7), (ii) the first driven gearwheel (15) synchronized to the output shaft (2) by the third synchronizer (9), and (iii) the input shaft (1) coupled to the ICE (30), wherein power from the ICE (30) in the second forward speed ratio in the hybrid driving mode is transmitted in sequence through the first driving gearwheel (10) synchronized to the input shaft (1), the first driven gearwheel (15) synchronized to the output shaft (2), the speed-reducing gearwheel (14) on the output shaft (2), and the final driven gearwheel (25), and wherein power from the EM 50 in the second forward speed ratio in the hybrid driving mode is transmitted in sequence through the fifth driving gearwheel (24) on the motor shaft (4), the sixth driven gearwheel (20) on the second intermediate shaft (3), the seventh driven gearwheel (21) on the second intermediate shaft (3), the first driven gearwheel (15) on the output shaft (2), the speed-reducing gearwheel (14) on the output shaft (2), and the final driven gearwheel (25).

Example 27

The hybrid-power driving system in any of EXAMPLES 6-26, wherein the hybrid-power driving system provides for transmission of power in a first instance of a third forward speed ratio in a hybrid driving mode with (i) the fourth driving gearwheel (13) synchronized to the input shaft (1) by the second synchronizer (8), (ii) first driven gearwheel (15) synchronized to the output shaft (2) by the third synchronizer (9), and (ii) the input shaft (1) coupled to the ICE (30), wherein power from the ICE (30) in the first instance of the third forward speed ratio in the hybrid driving mode is transmitted in sequence through the fourth driving gearwheel (13) synchronized to the input shaft (1), the third driven gearwheel (19) disposed on the output shaft (2), the speed-reducing gearwheel (14) on the output shaft (2), and the final driven gearwheel (25), and wherein power from the EM 50 in the first instance of the third forward speed ratio in the hybrid driving mode is transmitted in sequence through the fifth driving gearwheel (24) on the motor shaft (4), the sixth driven gearwheel (20) on the second intermediate shaft (3), the first driven gearwheel (15) on the output shaft (2), the speed-reducing gearwheel (14) on the output shaft (2), and the final driven gearwheel (25).

Example 28

The hybrid-power driving system in any of EXAMPLES 6-27, wherein the hybrid-power driving system provides for transmission of power in a second instance of a third forward speed ratio in a hybrid driving mode with (i) the first driving gearwheel (10) synchronized to the input shaft (1) by the first synchronizer (7), the fourth driving gearwheel (13) synchronized to the input shaft (1) by the second synchronizer (8), and (iii) the input shaft (1) coupled to the ICE (30), wherein power from the ICE (30) in the second instance of the third forward speed ratio in the hybrid driving mode is transmitted in sequence through the fourth driving gearwheel (13) synchronized to the input shaft (1), the third driven gearwheel (19) disposed on the output shaft (2), the speed-reducing gearwheel (14) on the output shaft (2), and the final driven gearwheel (25), and wherein power from the EM 50 in the second instance of the third forward speed ratio in the hybrid driving mode is transmitted in sequence through the fifth driving gearwheel (24) on the motor shaft (4), the sixth driven gearwheel (20) on the second intermediate shaft (3), the seventh driven gearwheel (21) on the second intermediate shaft (3), the first driven gearwheel (15) on the output shaft (2), the first driving gearwheel (10) on the input shaft (1), the fourth driving gearwheel (13) on the input shaft (1), the third driven gearwheel (19) on the output shaft (2), the speed-reducing gearwheel (14) on the output shaft (2), and the final driven gearwheel (25).

Example 29

The hybrid-power driving system in any of EXAMPLES 6-28, wherein the hybrid-power driving system provides for transmission of power in a third instance of a third forward speed ratio in a hybrid driving mode with (i) the second driving gearwheel (11) synchronized to the input shaft (1) by the first synchronizer (7), (ii) the fourth driving gearwheel (13) synchronized to the input shaft (1) by the second synchronizer (8), and (iii) the input shaft (1) coupled to the ICE (30), wherein power from the ICE (30) in the third instance of the third forward speed ratio in the hybrid driving mode is transmitted in sequence through the fourth driving gearwheel (13) synchronized to the input shaft (1), the third driven gearwheel (19) disposed on the output shaft (2), the speed-reducing gearwheel (14) on the output shaft (2), and the final driven gearwheel (25), and wherein power from the EM 50 in the third instance of the third forward speed ratio in the hybrid driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on the first intermediate shaft (5), the second driving gearwheel (11) on the input shaft (1), the fourth driving gearwheel (13) on the input shaft (1), the third driven gearwheel (19) on the output shaft (2), the speed-reducing gearwheel (14) on the output shaft (2), and the final driven gearwheel (25).

Example 30

The hybrid-power driving system in any of EXAMPLES 6-29,
wherein the hybrid-power driving system provides for transmission of power in a fourth instance of a third forward speed ratio in a hybrid driving mode with (i) the fourth driving gearwheel (13) synchronized to the input shaft (1) by the second synchronizer (8), (ii) the fourth driven gearwheel (16) synchronized to the first intermediate shaft (5) by the second synchronizer (8), and (iii) the input shaft (1) coupled to the ICE (30),
wherein power from the ICE (30) in the fourth instance of the third forward speed ratio in the hybrid driving mode is transmitted in sequence through the fourth driving gearwheel (13) synchronized to the input shaft (1), the third driven gearwheel (19) disposed on the output shaft (2), the speed-reducing gearwheel (14) on the output shaft (2), and the final driven gearwheel (25), and
wherein power from the EM 50 in the fourth instance of the third forward speed ratio in the hybrid driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on first intermediate shaft (5), the speed-reducing gearwheel (14) on the output shaft (2), and the final driven gearwheel (25).

Example 31

The hybrid-power driving system in any of EXAMPLES 6-30,
wherein the hybrid-power driving system provides for transmission of power in a fourth forward speed ratio in a hybrid driving mode with (i) the second driving gearwheel (11) synchronized to the input shaft (1) by the first synchronizer (7), (ii) the fourth driven gearwheel (16) synchronized to the first intermediate shaft (5) by the third synchronizer (9), and (iii) the input shaft (1) coupled to the ICE (30),
wherein power from the ICE (30) in the fourth forward speed ratio in the hybrid driving mode is transmitted in sequence through the second driving gearwheel (11) on the input shaft (1), the fourth driven gearwheel (16) on the first intermediate shaft (5), the speed-reducing gearwheel (14) on the output shaft (2), and the final driven gearwheel (25), and
wherein power from the EM 50 in the fourth forward speed ratio in the hybrid driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on first intermediate shaft (5), the speed-reducing gearwheel (14) on the output shaft (2), and the final driven gearwheel (25).

Example 32

The hybrid-power driving system in any of EXAMPLES 6-31,
wherein the hybrid-power driving system provides for transmission of power in a fifth forward speed ratio in a hybrid driving mode with (i) the third driving gearwheel (12) synchronized to the input shaft (1) by the second synchronizer (8), (ii) the fourth driven gearwheel (16) synchronized to the first intermediate shaft (5) by the third synchronizer (9), and (iii) the input shaft (1) coupled to the ICE (30),
wherein power from the ICE (30) in the fifth forward speed ratio in the hybrid driving mode is transmitted in sequence through the third driving gearwheel (12) on the input shaft (1), the second driven gearwheel (18) on the output shaft (2), the speed-reducing gearwheel (14) on the output shaft (2), and the final driven gearwheel (25), and
wherein power from the EM 50 in the fifth forward speed ratio in the hybrid driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on first intermediate shaft (5), the speed-reducing gearwheel (14) on the output shaft (2), and the final driven gearwheel (25).

Example 33

The hybrid-power driving system in any of EXAMPLES 6-32,
wherein the hybrid-power driving system provides for transmission of power in a sixth forward speed ratio in a hybrid driving mode with (i) the first driving gearwheel (10) synchronized to the input shaft (1) by the first synchronizer (7), (ii) the fourth driven gearwheel (16) synchronized to the first intermediate shaft (5) by the third synchronizer (9), and (iii) the input shaft (1) coupled to the ICE (30),
wherein power from the ICE (30) in the sixth forward speed ratio in the hybrid driving mode is transmitted in sequence through the first driving gearwheel (10) synchronized to the input shaft (1), the first driven gearwheel (15) disposed on the output shaft (2), the seventh driven gearwheel (21) disposed on the second intermediate shaft (3), the eighth driven gearwheel (22) on the second intermediate shaft (3), the fifth driven gearwheel (17) on the first intermediate shaft (5), the speed-reducing gearwheel (14) on the output shaft (2), and the final driven gearwheel (25), and
wherein power from the EM 50 in the sixth forward speed ratio in the hybrid driving mode is transmitted in sequence through the fifth driving gearwheel (24) on the motor shaft (4), the sixth driven gearwheel (20) on the second intermediate shaft (3), the eighth driven gearwheel (22) on the second intermediate shaft (3), the fifth driven gearwheel (17) on the first intermediate shaft (5), the speed-reducing gearwheel (14) on the output shaft (2), and the final driven gearwheel (25).

Example 34

The hybrid-power driving system in any of EXAMPLES 10-33,
wherein the hybrid-power driving system provides for transmission of power to provide a reverse speed ratio in a hybrid driving mode with (i) the first driven gearwheel (15) synchronized to the output shaft (2) by the third synchronizer (9), (ii) the sixth driving gearwheel (8) is meshed with the ninth driven gearwheel (23), and (iii) the input shaft (1) coupled to the ICE (30), and
wherein power from the ICE (30) for transmission of power to provide a reverse speed ratio in the hybrid driving mode is transmitted in sequence through the sixth driving gearwheel (8) on the input shaft (1), the ninth driven gearwheel (23) on the second intermediate shaft (3), the seventh driven gearwheel (21) on the second intermediate shaft (3), the first driven gearwheel (15) synchronized to the output shaft (2), the speed-reducing gearwheel (14) on the output shaft (2), and the final driven gearwheel (25), and wherein power from the EM 50 for transmission of power to provide a reverse speed ratio in the hybrid driving mode is transmitted in sequence through the fifth driving gearwheel (24) on the motor shaft (4), the sixth driven gearwheel (20) on the second intermediate shaft (3), the seventh driven gearwheel (21) on the second intermediate shaft (3), the first driven gearwheel (15) synchronized to the output shaft (2), the speed-reducing gearwheel (14) on the output shaft (2), and the final driven gearwheel (25).

Example 35

The hybrid-power driving system in any of EXAMPLES 1-34,
wherein the first driving gearwheel (10) includes a second-speed-ratio driving gearwheel,
wherein the second driving gearwheel (11) includes a fourth-speed-ratio driving gearwheel,
wherein the first synchronizer (7) includes a second-and-fourth-speed-ratio synchronizer,
wherein the third driving gearwheel (12) includes a fifth-speed-ratio driving gearwheel,
wherein the fourth driving gearwheel (13) includes a third-speed-ratio driving gearwheel,
wherein the second synchronizer (8) includes a third-and-fifth-speed-ratio synchronizer,
wherein the first driven gearwheel (15) includes a second-speed-ratio driven gearwheel,
wherein the second driven gearwheel (18) includes a fifth-speed-ratio driven gearwheel,
wherein the third driven gearwheel (19) includes a third-speed-ratio driven gearwheel, and
wherein the ninth driven gearwheel (23) includes a reverse-gear driven gearwheel.

Example 36

The hybrid-power driving system in any of EXAMPLES 6-35,
wherein each of the input shaft (1), the output shaft (2), the first intermediate shaft (5), the second intermediate shaft (3), and the motor shaft (4) include a first shaft-end-portion and a second shaft-end-portion opposite the first shaft-end-portion of that shaft,
wherein the starting from the first shaft-end-portion of the input shaft (1), the first driving gearwheel (10), the first synchronizer (7), the second driving gearwheel (11), the third driving gearwheel (12), the second synchronizer (8), and the fourth driving gearwheel (13) are arranged in that order on the input shaft (1) between the first shaft-end-portion of the input shaft (1) and the second shaft-end-portion of the input shaft (1),
wherein the starting from the first shaft-end-portion of the output shaft (2), the speed-reducing gearwheel (14), the first driven gearwheel (15), the third synchronizer (9), the first intermediate shaft (5), the second driven gearwheel (18), and the third driven gearwheel (19) are arranged in that order on the output shaft (2) between the first shaft-end-portion of the output shaft (2) and the second shaft-end-portion of the output shaft (2),
wherein the starting from the first shaft-end-portion of the first intermediate shaft (5), the fourth driven gearwheel (16) and the fifth driven gearwheel (17) are arranged in that order on the first intermediate shaft (5) between the first shaft-end-portion of the first intermediate shaft (5) and the second shaft-end-portion of the first intermediate shaft (5), wherein the starting from the first shaft-end-portion of the second intermediate shaft (3), the sixth driven gearwheel (20), the seventh driven gearwheel (21), the eighth driven gearwheel (22), and the ninth driven gearwheel (23) are arranged in that order on the second intermediate shaft (3) between the first shaft-end-portion of the second intermediate shaft (3) and the second shaft-end-portion of the second intermediate shaft (3), and
wherein the starting from the first shaft-end-portion of the motor shaft (4), the fifth driving gearwheel (24) and at least a portion of EM (50) is between the first shaft-end-portion of motor shaft (4) and the second shaft-end-portion of the motor shaft (4).

Example 38

The hybrid-power driving system in any of EXAMPLES 7-37, further comprising: a first half-axle (6a) and a second half-axle (6b) coupled to the differential (60), wherein power transmitted to the final driven gearwheel (25) is output by at least one of the first half-axle (6a) and the second half-axle (6b).

Example 39

The hybrid-power driving system in any of EXAMPLES 1-38, further comprising: a first sleeve (10a), a second sleeve (11a), a third sleeve (12a), a fourth sleeve (13a), and a fifth sleeve (15a), wherein the first sleeve (11a), the second sleeve (12a), the third sleeve (13a), and the fourth sleeve (14a) are disposed on the input shaft (1) and provide for the first driving gearwheel (10), the second driving gearwheel (11), the third driving gearwheel (12), and the fourth driving gearwheel (13) to be rotatably carried by the input shaft (1), and wherein the fifth sleeve (15a) is disposed on the output shaft (2) and provides for the first driven gearwheel (15) to be rotatably carried by the output shaft (2).

Example 40

The hybrid-power driving system in any of EXAMPLES 5-39, wherein the hybrid-power driving system comprises a transmission (70) including the input shaft (1), the output shaft (2), the first intermediate shaft (5), the second intermediate shaft (3), the motor shaft (4), the first synchronizer (7), the second synchronizer (26), the third synchronizer (9), the first driving gearwheel (10), the second driving gearwheel (11), the third driving gearwheel (12), the fourth driving gearwheel (13), the speed-reducing gearwheel (14), the first driven gearwheel (15), the second driven gearwheel (18), the third driven gearwheel (19), the fourth driven gearwheel (16), the fifth driven gearwheel (17), the sixth driven gearwheel (20), the seventh driven gearwheel (21), the eighth driven gearwheel (22), the ninth driven gearwheel (23), and the gearbox.

Example 41

The hybrid-power driving system of EXAMPLE 40, wherein the transmission (70) is configured to be shifted to achieve different speed ratios without interrupting power to the final driven gearwheel (25).

Example 42

A hybrid-power driving system (HPDS) comprising:
an internal combustion engine (ICE) (30);
an electric motor (50); and
a transmission (70) including a set of gearwheels, multiple transmission shafts, a first synchronizer, a second synchronizer, and a third synchronizer,
wherein the set of gearwheels includes multiple gearwheels that are used in multiple speed ratios available by shifting of the gearwheels,
wherein each of the first synchronizer, the second synchronizer, and the third synchronizer are moveable axially to releasably engage at least two gearwheels from one of the transmission shafts, and
wherein shifting of the gearwheels to achieve different speed ratios in a hybrid-power driving mode occurs without power interruption to a final driven gearwheel (25) of the transmission (70).

VI. Conclusion

Example embodiments have been described above. Those skilled in the art will understand that changes and modifications can be made to the described embodiments without departing from the true scope and spirit of the present invention, which is defined by the claims.

We claim:

1. A hybrid-power driving system comprising:
an input shaft carrying a first driving gearwheel, a second driving gearwheel, a third driving gearwheel, and a fourth driving gearwheel disposed thereon;
a first synchronizer, disposed on the input shaft, for releasably synchronizing at least one of the first driving gearwheel and the second driving gearwheel to the input shaft,
a second synchronizer, disposed on the input shaft, for releasably synchronizing at least one of the third driving gearwheel and the fourth driving gearwheel to the input shaft;
an output shaft carrying a speed-reducing gearwheel, a first driven gearwheel, a second driven gearwheel, and a third driven gearwheel disposed thereon;
a first intermediate shaft carrying a fourth driven gearwheel and a fifth driven gearwheel disposed thereon, wherein the first intermediate shaft includes a hollow portion and is coaxial to the output shaft;
a third synchronizer, disposed on the output shaft, for releasably synchronizing at least one of the first driven gearwheel and both the fourth driven gearwheel and the fifth driven gearwheel to the output shaft;
a second intermediate shaft carrying a sixth driven gearwheel, a seventh driven gearwheel, an eighth driven gearwheel, and a ninth driven gearwheel disposed thereon;
a motor shaft carrying a fifth driving gearwheel disposed thereon; and
a final driven gearwheel.

2. The hybrid-power driving system of claim 1, further comprising:
a chain or belt that links the sixth driven gearwheel to the fifth driving gearwheel.

3. The hybrid-power driving system of claim 1, further comprising:
a third intermediate shaft carrying a tenth driven gearwheel and an eleventh driven gearwheel,
wherein the tenth driven gearwheel meshes with the fifth driving gearwheel, and
wherein the eleventh driven gearwheel meshes with the sixth driven gearwheel.

4. The hybrid-power driving system of claim 1, wherein the input shaft, the output shaft, the first intermediate shaft, the second intermediate shaft, and the motor shaft are parallel to each other.

5. The hybrid-power driving system of claim 1, further comprising:
an internal combustion engine (ICE); and
an electric motor (EM).

6. The hybrid-power driving system of claim 1, further comprising:
a clutch disposed between the ICE;
a differential that meshes with the final driven gearwheel,
wherein the clutch is configured to couple the input shaft to the ICE, and
wherein the clutch is disposed between the ICE and a one of the first driving gearwheel, the second driving gearwheel, the third driving gearwheel, and the fourth driving gearwheel that is positioned on the input shaft closest to the ICE.

7. The hybrid-power driving system of claim 1,
wherein the first synchronizer is configured for releasably synchronizing the first driving gearwheel and the second driving gearwheel to the input shaft one at a time, and
wherein the second synchronizer is configured for releasably synchronizing the third driving gearwheel and the fourth driving gearwheel to the input shaft one at a time.

8. The hybrid-power driving system of claim 1, further comprising:
a sixth driving gearwheel carried by the input shaft, wherein the ninth driven gearwheel is slidable to releasably mesh with the sixth driving gearwheel;
wherein the sixth driving gearwheel is disposed on the second synchronizer.

9. The hybrid-power driving system of claim 1, wherein the third synchronizer is configured for releasably synchronizing the first driven gearwheel and the fourth driven gearwheel to the output shaft one at a time.

10. The hybrid-power driving system of claim 1,
wherein the first driven gearwheel constantly meshes with the first driving gearwheel and the seventh driven gearwheel,
wherein the second driving gearwheel constantly meshes with the fourth driven gearwheel,
wherein the third driving gearwheel constantly meshes with the second driven gearwheel,
wherein the fourth driving gearwheel constantly meshes with the third driven gearwheel,
wherein the fifth driven gearwheel constantly meshes with the eighth driven gearwheel, and
wherein the speed-reducing gearwheel constantly meshes with the final driven gearwheel.

11. A hybrid-power driving system (HPDS) comprising:
an internal combustion engine (ICE);
an electric motor; and
a transmission including a set of gearwheels, multiple transmission shafts, and only three synchronizers which comprise a first synchronizer, a second synchronizer, and a third synchronizer,
wherein the set of gearwheels includes multiple gearwheels that are used in six forward speed ratios for the ICE available by shifting of the gearwheels, wherein each of the first synchronizer, the second synchronizer, and the third synchronizer are moveable axially to releasably engage at least two gearwheels from one of the transmission shafts, and wherein shifting of the gearwheels to achieve different speed ratios in a hybrid-power driving mode occurs without power interruption to a final driven gearwheel of the transmission.

\* \* \* \* \*